(12) United States Patent
Hamid

(10) Patent No.: US 9,898,594 B2
(45) Date of Patent: Feb. 20, 2018

(54) METHODS AND SYSTEMS FOR DATA ENTRY

(71) Applicant: BluInk Ltd., Ottawa (CA)

(72) Inventor: Laurence Hamid, Ottawa (CA)

(73) Assignee: BluInk Ltd., Ottawa (CA)

( * ) Notice: Subject to any disclaimer, the term of this patent is extended or adjusted under 35 U.S.C. 154(b) by 0 days.

(21) Appl. No.: 14/662,850

(22) Filed: Mar. 19, 2015

(65) Prior Publication Data

US 2015/0269369 A1 Sep. 24, 2015

Related U.S. Application Data

(63) Continuation-in-part of application No. 14/341,916, filed on Jul. 28, 2014.

(60) Provisional application No. 61/955,386, filed on Mar. 19, 2014, provisional application No. 61/993,755, filed on May 15, 2014.

(51) Int. Cl.
| | |
|---|---|
| *G06F 21/31* | (2013.01) |
| *G06F 9/44* | (2018.01) |
| *G06F 21/35* | (2013.01) |
| *G06F 21/45* | (2013.01) |
| *H04L 29/06* | (2006.01) |
| *G06F 3/0488* | (2013.01) |

(52) U.S. Cl.
CPC .......... *G06F 21/31* (2013.01); *G06F 3/04886* (2013.01); *G06F 9/4401* (2013.01); *G06F 21/35* (2013.01); *G06F 21/45* (2013.01); *H04L 63/083* (2013.01); *H04L 63/0853* (2013.01)

(58) Field of Classification Search
CPC ........ G06F 21/31; G06F 3/023; G06F 9/4401; G06F 21/35; G06F 21/45; H04L 63/083; H04L 63/0853
USPC .......................................................... 726/7
See application file for complete search history.

(56) References Cited

U.S. PATENT DOCUMENTS

| | | | | |
|---|---|---|---|---|
| 5,475,377 A | * | 12/1995 | Lee .......................... | G06F 21/35 340/5.9 |
| 2012/0316963 A1 | * | 12/2012 | Moshfeghi ............. | G06Q 20/20 705/14.58 |
| 2013/0303146 A1 | * | 11/2013 | Van Voorhees ......... | G06F 21/53 455/418 |

(Continued)

*Primary Examiner* — Hadi Armouche
*Assistant Examiner* — Sakinah Taylor
(74) *Attorney, Agent, or Firm* — Rosenberg, Klein & Lee

(57) ABSTRACT

User identities, password, etc. represent the barrier between a user's confidential data and any other third party seeking to access this data. As multiple software applications, web applications, web services, etc. embody this confidential data it is a tradeoff between easy recollection of said identities, passwords, etc. and data security. Generally for most users the balance is too far to convenience and ease of recollection such that the probability of third party illegally accessing the confidential data increases. Accordingly, it would be beneficial for users as well as organizations providing/controlling access to systems, resources, and data to be provided with an automatic means of entering password and/or security credential information without the user, for example, selecting the password, knowing the password, having access to the password, or entering the password where the organizations providing/controlling access can establish geo-fences relating to the credential information.

14 Claims, 21 Drawing Sheets

(56) References Cited

U.S. PATENT DOCUMENTS

2014/0181529 A1* 6/2014 Joyce, III .............. H04L 63/083
　　　　　　　　　　　　　　　　　　　　713/183

* cited by examiner

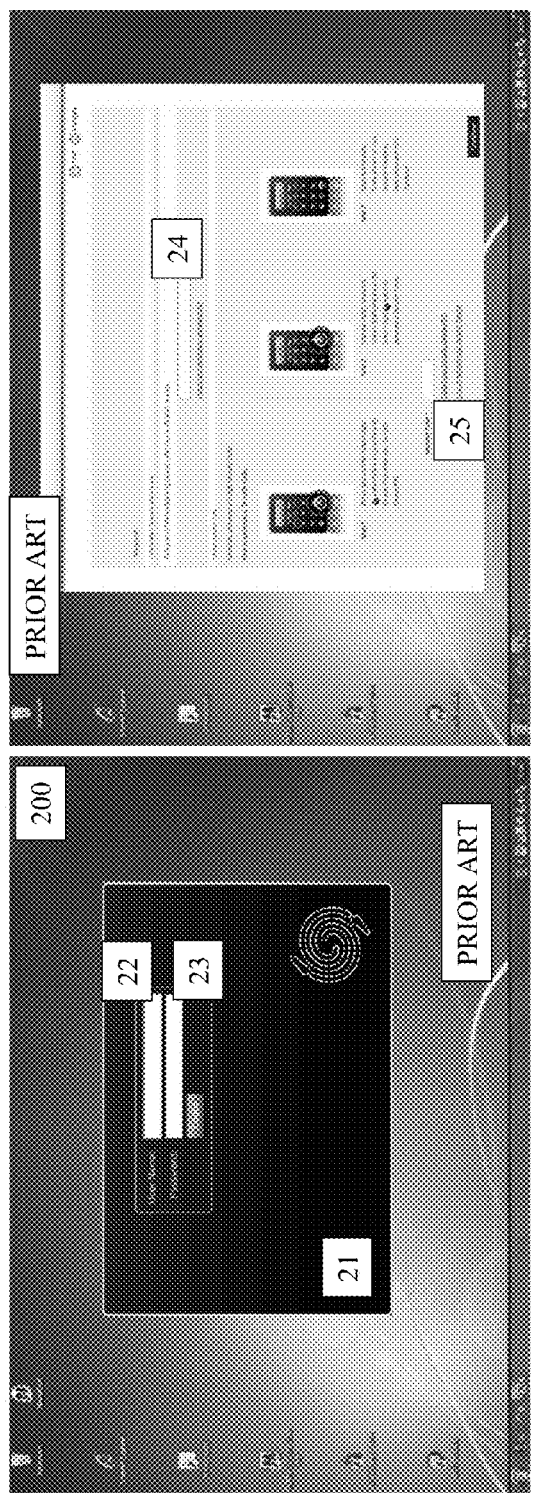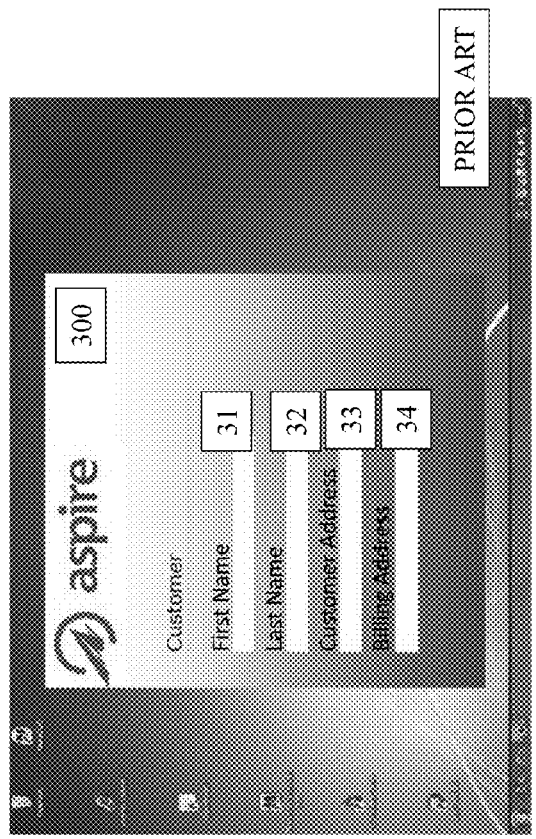
Figure 2A
Figure 2B
Figure 3

400

500A

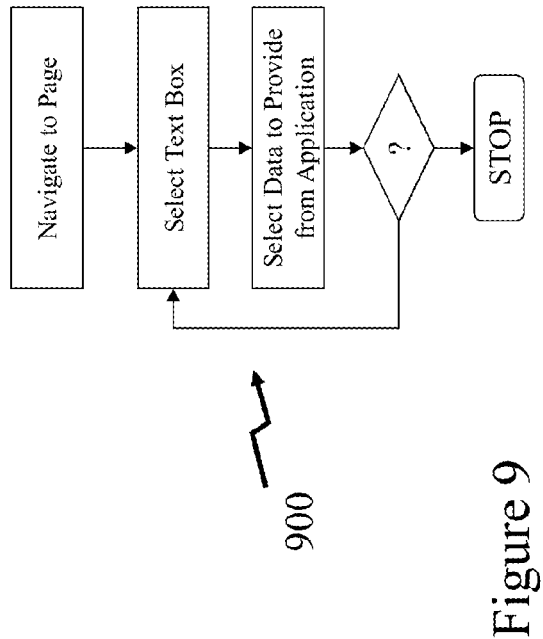
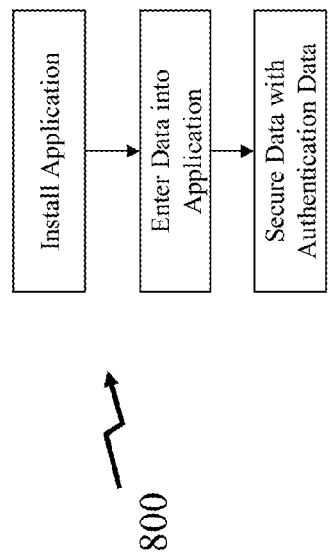
Figure 8
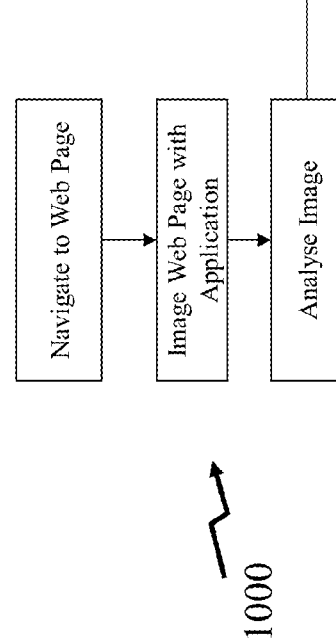
Figure 9
Figure 10

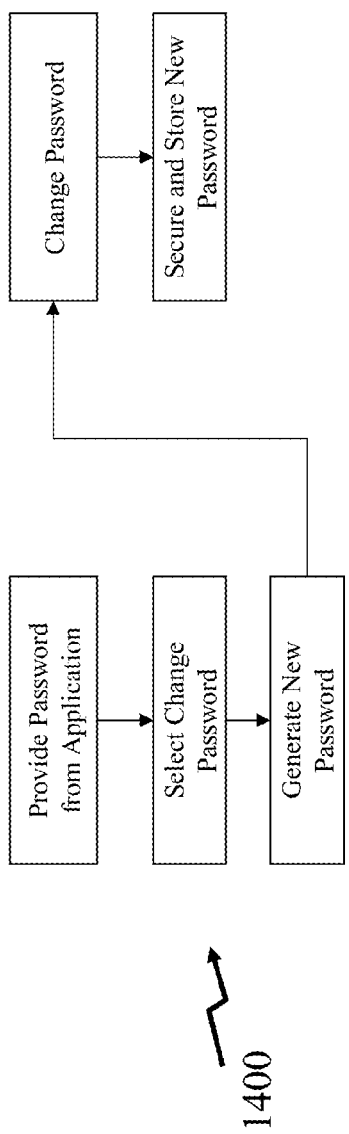
Figure 14
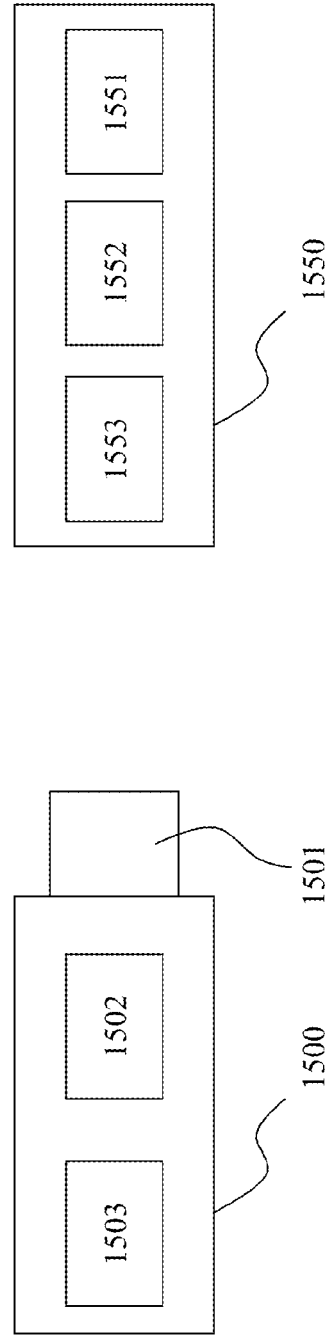
Figure 15B
Figure 15A

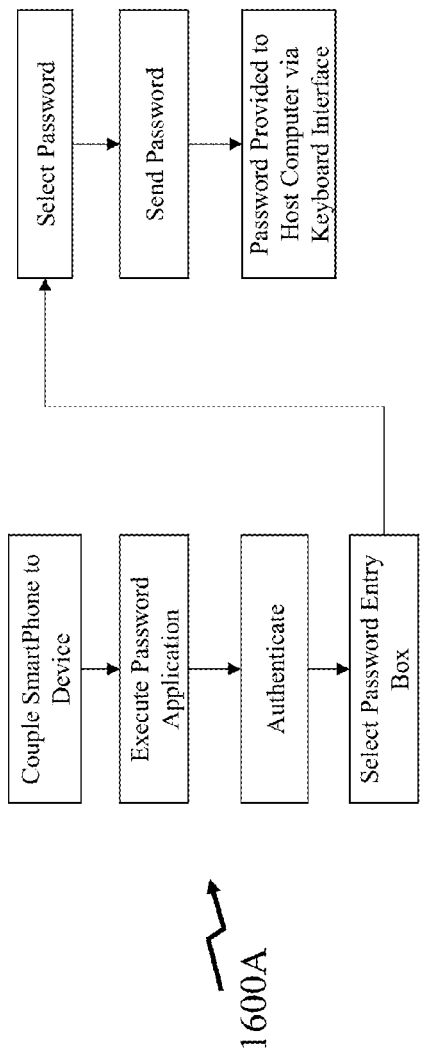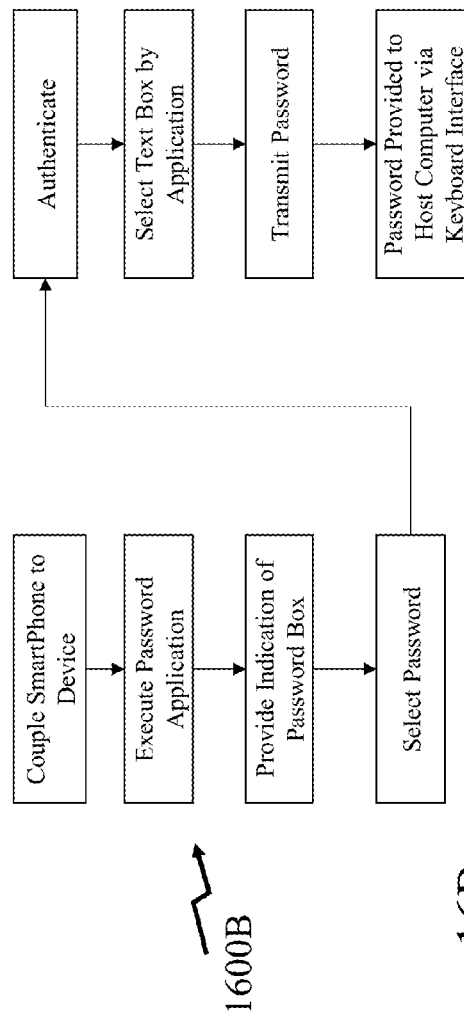
Figure 16A
Figure 16B

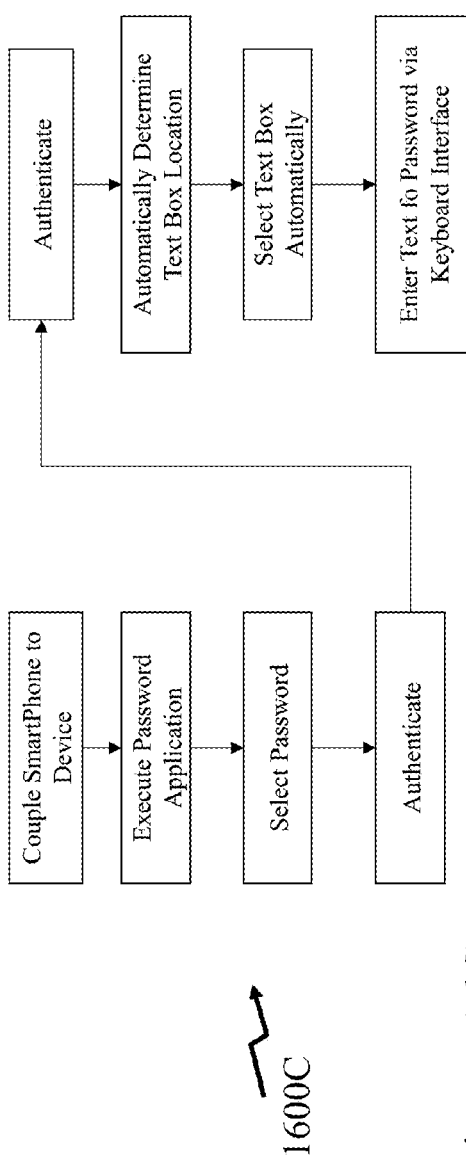
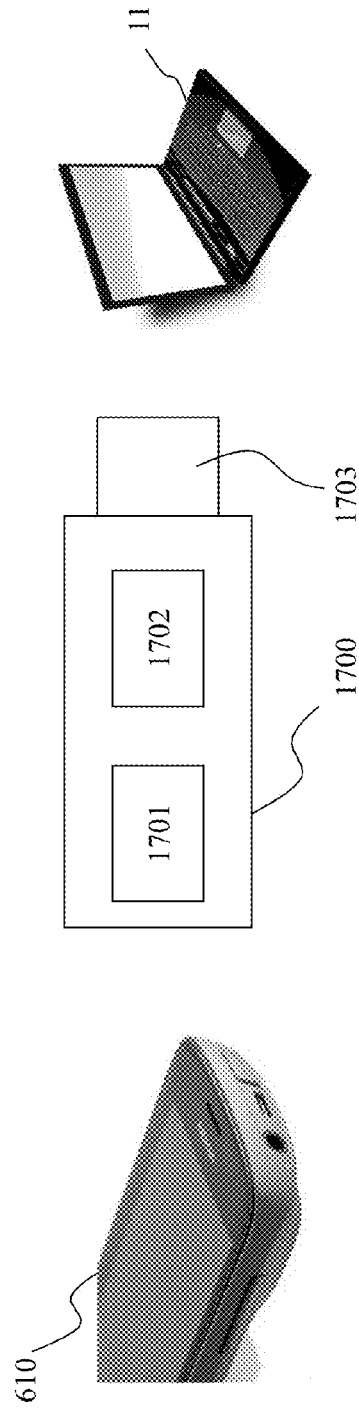
Figure 16C
Figure 17

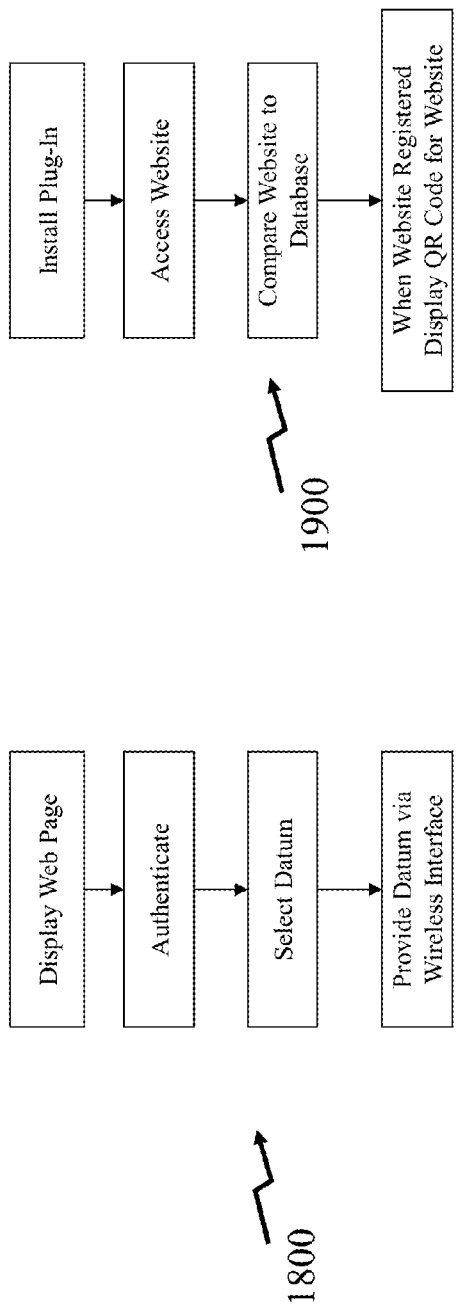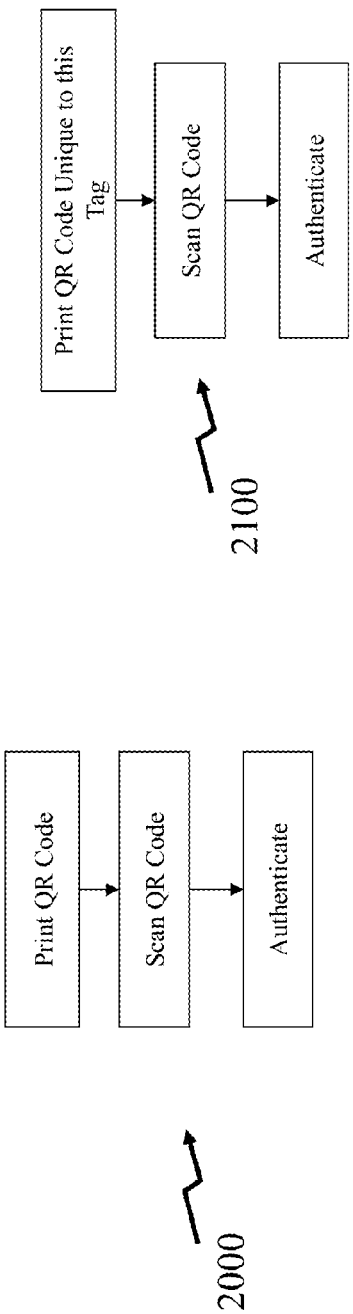
Figure 18 — 1800
Figure 19 — 1900
Figure 20 — 2000
Figure 21 — 2100

METHODS AND SYSTEMS FOR DATA ENTRY

CROSS-REFERENCE TO RELATED APPLICATIONS

This application claims the benefit of priority from U.S. Provisional Patent Application Ser. No. 61/955,386 entitled "System and Method for Data Entry" filed Mar. 19, 2014; from U.S. Provisional Patent Application Ser. No. 61/993,755 filed May 15, 2014 entitled "System and Method for Data Entry;" and from U.S. patent application Ser. No. 14/341,916 entitled "Methods and Systems for Data Entry" filed Jul. 28, 2014, the entire contents of these applications being included herein by reference.

FIELD OF THE INVENTION

This invention relates to security credentials and more particularly to entry of digital and/or security credential data that is difficult for the user to enter and/or remember such as passwords, credit card numbers, identification numbers, and digital signatures.

BACKGROUND OF THE INVENTION

A password is a word or string of characters used for user authentication to prove identity or access approval to gain access to a resource, for example an access code is a type of password, which should be kept secret from those not allowed access. The use of passwords is known to be ancient. Sentries would challenge those wishing to enter an area or approaching it to supply a password or watchword, and would only allow a person or group to pass if they knew the password. In modern times, user names and passwords are commonly used by people during a process of a logging in (login) process that controls access to protected computer operating systems, including, but not limited to, mobile phones, cable TV decoders, computers, electronic banking, electronic mail, and automated teller machines (ATMs). A typical computer user has passwords for many purposes including but not limited to, logging into accounts, retrieving e-mail, accessing applications, databases, networks, web sites, and even reading the morning newspaper online.

Despite their name, there is no requirement for passwords to be actual words; indeed passwords which are not actual words may be harder to guess, which is a desirable property, when trying to prevent unauthorized access to the resource (s) and/or data the password allows a user to access. Some passwords are formed from multiple words and may more accurately be called a passphrase. The term passcode is sometimes used when the secret information is purely numeric, such as the personal identification number (PIN) commonly used for ATM access. Passwords are generally short enough to be easily memorized and typed.

Many organizations specify a password policy that sets requirements for the composition and usage of passwords, typically dictating minimum length, required categories (e.g. upper and lower case, numbers, and special characters), prohibited elements (e.g. own name, date of birth, address, telephone number). Some governments have national authentication frameworks that define requirements for user authentication to government services, including requirements for passwords. However, despite such policies and in many other instances the password of an individual for a particular login will be something that they can easily remember. Today, in 2014, despite over twenty years of increasing penetration of the Internet, electronic devices, electronic resources, and systems the most common password is "123456" having recently unseated "password." Further, with passwords for a large number of electronic devices and systems it is also common for a user to repeat the same password with multiple devices and systems.

Hence, a third party by gathering personal data on a user may make a reasonable attempt at the password and where successful probably access multiple systems, resources, and data employed or relating to the user. This is, of course, if the user has not simply written it down next to their computer or on a note in their desk, office, home, car, etc.

Not surprisingly, therefore there exist a series of applications that allow a user to store their passwords in a memory device and to retrieve them when needed. Typically, these applications fall into two categories. In the first, for increased security, the passwords are encoded and stored and access to the passwords is provided in response to user validation. However, the user still enters the password themselves once it is shown to them and accordingly, these applications are little more than a black book of passwords and actually not very convenient. In the second category, the device storing the password(s) is specific to the server being accessed and it therefore can provide a higher degree of security. However, such a system is either integrated with a server or specific to the server and/or solution installed.

Accordingly, it would be beneficial to provide users as well as organizations providing/controlling access to systems, resources, and data to be provided with an automatic means of entering password and/or security credential information without the user, for example, selecting the password, knowing the password, having access to the password, or entering the password.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to security credentials and more particularly to entry of digital and/or security credential data that is difficult for the user to enter and/or remember such as passwords, credit card numbers, identification numbers, and digital signatures.

In accordance with an embodiment of the invention there is provided a method comprising:
  establishing a software keyboard upon a first device comprising at least a first microprocessor and a memory, the software keyboard being a predetermined one of a plurality of software keyboards supported by the first device wherein each software keyboard of the plurality of software keyboards relates to a predetermined language;
  transmitting signals from the first device to a second device comprising at least a second microprocessor via a communications interface according to a first predetermined standard, the signals comprising a data relating to keyboard actions of a user upon the software keyboard on the first device; and
  in dependence upon the data within the signal received at the second device generating and providing second signals with the second microprocessor to a third device to which the second device is connected such that the second signals mimic user actions with a physical keyboard.

In accordance with an embodiment of the invention there is provided a method comprising authorizing a memory device to provide access to data stored within the memory device relating to an operating system with a first device connected to the memory device, and using the data stored within the memory device to boot an electronic device that is also connected to the memory device with the operating system.

In accordance with an embodiment of the invention there is provided a method comprising:

storing a plurality of data within a first device comprising at least a first microprocessor and a memory, the plurality of data representing user credentials relating to access upon at least one second device;

establishing an authorization upon the first device with respect to the user associated with the user credentials in dependence upon the first device being within a predetermined geo-fence established in dependence upon the user credentials;

transmitting in dependence upon the authorization a signal from the first device to a second device comprising at least a second microprocessor via a communications interface according to a first predetermined standard, the signal comprising a predetermined subset of data within the plurality of data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2A is a view of a computer screen having a login window displayed thereon;

FIG. 2B is a view of a computer screen having a user access window displayed thereon;

FIG. 3 is a view of a computer screen having a data entry window displayed thereon;

FIG. 8 is a simplified flow diagram of a method of entering data into a password storage application according to an embodiment of the invention;

FIG. 9 is a simplified flow diagram of a method of using an app to provide data to a host computer system according to an embodiment of the invention;

FIG. 10 is a simplified flow diagram of a method of using an app that extracts from image data fields to fill in in order to provide data to a host computer system according to an embodiment of the invention;

FIG. 14 is a simplified flow diagram of a method of creating a one-time password system from a user accessible system according to an embodiment of the invention;

FIG. 15A is a simplified block diagram of a USB device for wireless communication and for providing data entry via a user input interface in the form of a keyboard interface according to an embodiment of the invention;

FIG. 15B is a simplified block diagram of a wireless device for wireless communication and for providing data entry via a user input interface in the form of a keyboard interface according to an embodiment of the invention;

FIG. 16A is a simplified flow diagram of a method of entering a password into a password entry screen such as that of FIG. 2 according to an embodiment of the invention;

FIG. 16B is a simplified flow diagram of another method of entering a password into a password entry screen such as that of FIG. 2 according to an embodiment of the invention;

FIG. 16C is a simplified flow diagram of another method of entering a password into a password entry screen such as that of FIG. 2 according to an embodiment of the invention;

FIG. 17 is simplified diagram showing an apparatus for providing password data to a computer system via a wireless interface in the form of a USB device for interfacing wirelessly with a mobile phone according to an embodiment of the invention;

FIG. 18 is a simplified flow diagram of a method of entering personal data on a web site according to an embodiment of the invention;

FIG. 19 is a simplified flow diagram of a method of automatically extracting web page bar codes according to an embodiment of the invention;

FIG. 20 is a simplified flow diagram of an authentication method according to an embodiment of the invention;

FIG. 21 is a simplified flow diagram of an authentication method according to an embodiment of the invention;

DETAILED DESCRIPTION

Figure 1A:
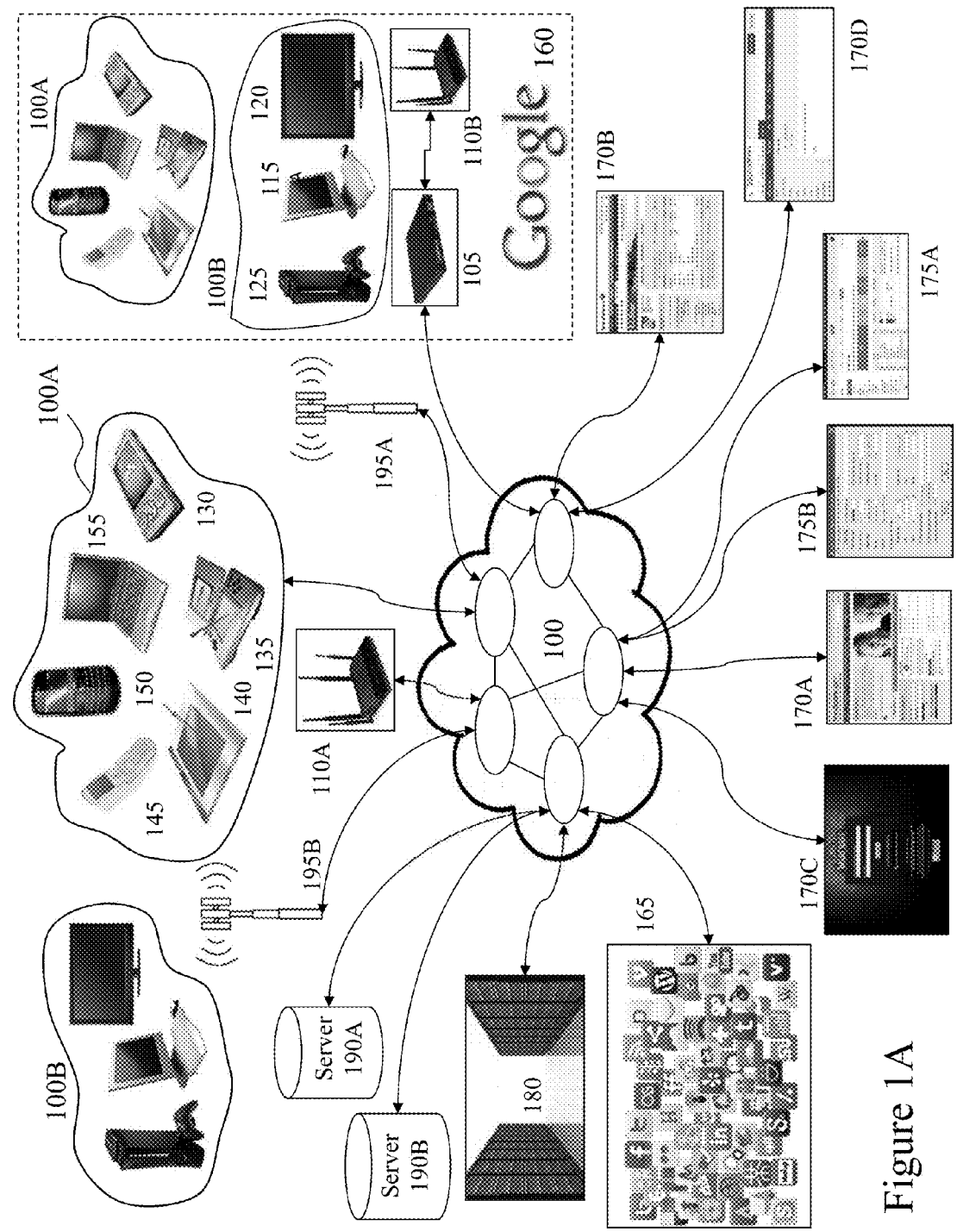
FIG. 1A depicts a network environment within which embodiments of the invention may be employed.

The present invention is directed to security credentials and more particularly to entry of security credentials and more particularly to entry of digital and/or security credential data that is difficult for the user to enter and/or remember such as passwords, credit card numbers, identification numbers, and digital signatures.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals who by their engagement with a service provider, third party provider, enterprise, social network, social media etc. via a dashboard, web service, website, software plug-in, software application, graphical user interface accesses, for example, electronic content and/or an electronic service. This includes, but is not limited to, private individuals, employees of organizations and/or enterprises, members of community organizations, members of charity organizations, men, women, children, and teenagers. In its broadest sense the user may further include, but not be limited to, software systems, mechanical systems, robotic systems, android systems, etc. that may be characterised by accessing, for example, electronic content and/or an electronic service.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

"Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Referring to FIG. 1A there is depicted a network environment 100 within which embodiments of the invention may be employed supporting password systems and/or password applications/providers (PSPAPs) according to embodiments of the invention. Such PSPAPs, for example support the provisioning of data to a user, e.g. electronic mail, the provisioning of services, e.g. online banking, online retail, etc., as well as other personal and work related resources, systems, data, etc. As shown first and second user groups 100A and 100B respectively interface to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. Google™, within which other first and second user groups 100A are and 100B. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 100A may form associations either through standards such as IEEE 802.15 and Bluetooth as well in an ad-hoc manner.

Also connected to the network 100 are Social Networks (SOCNETS) 165, such as Facebook™, LinkedIn™, first and second services 170A and 170B respectively, e.g. US Medicare.GOV and Bank of America™, online gaming website 170C, e.g. World of Warcraft™, cloud based email service 170D, e.g. Yahoo!™, customer resource management 175A, e.g. Streak CRM for Google Cloud, and digital document signature function 175, e.g. Adobe™ Acrobat, as well as first and second servers 190A and 190B which together with others, not shown for clarity. First and second servers 190A and 190B may host according to embodiments of the inventions multiple services associated with a provider of password systems and password applications/providers (PSPAPs); a provider of a SOCNET or Social Media (SOME) exploiting PSPAP features; a provider of a SOCNET and/or SOME not exploiting PSPAP features; a provider of services to PEDS and/or FEDS; a provider of one or more aspects of wired and/or wireless communications; an Enterprise 160 exploiting PSPAP features; license databases; content databases; image databases; content libraries; customer databases; websites; and software applications for download to or access by FEDs and/or PEDs exploiting and/or hosting PSPAP features. First and second primary content servers 190A and 190B may also host for example other Internet services such as a search engine, financial services, third party applications and other Internet based services.

Accordingly, a consumer and/or customer (CONCUS) may exploit a PED and/or FED within an Enterprise 160, for example, and access one of the first or second primary content servers 190A and 190B respectively to perform an operation such as accessing/downloading an application which provides PSPAP features according to embodiments of the invention; execute an application already installed providing PSPAP features; execute a web based application providing PSPAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 1B:
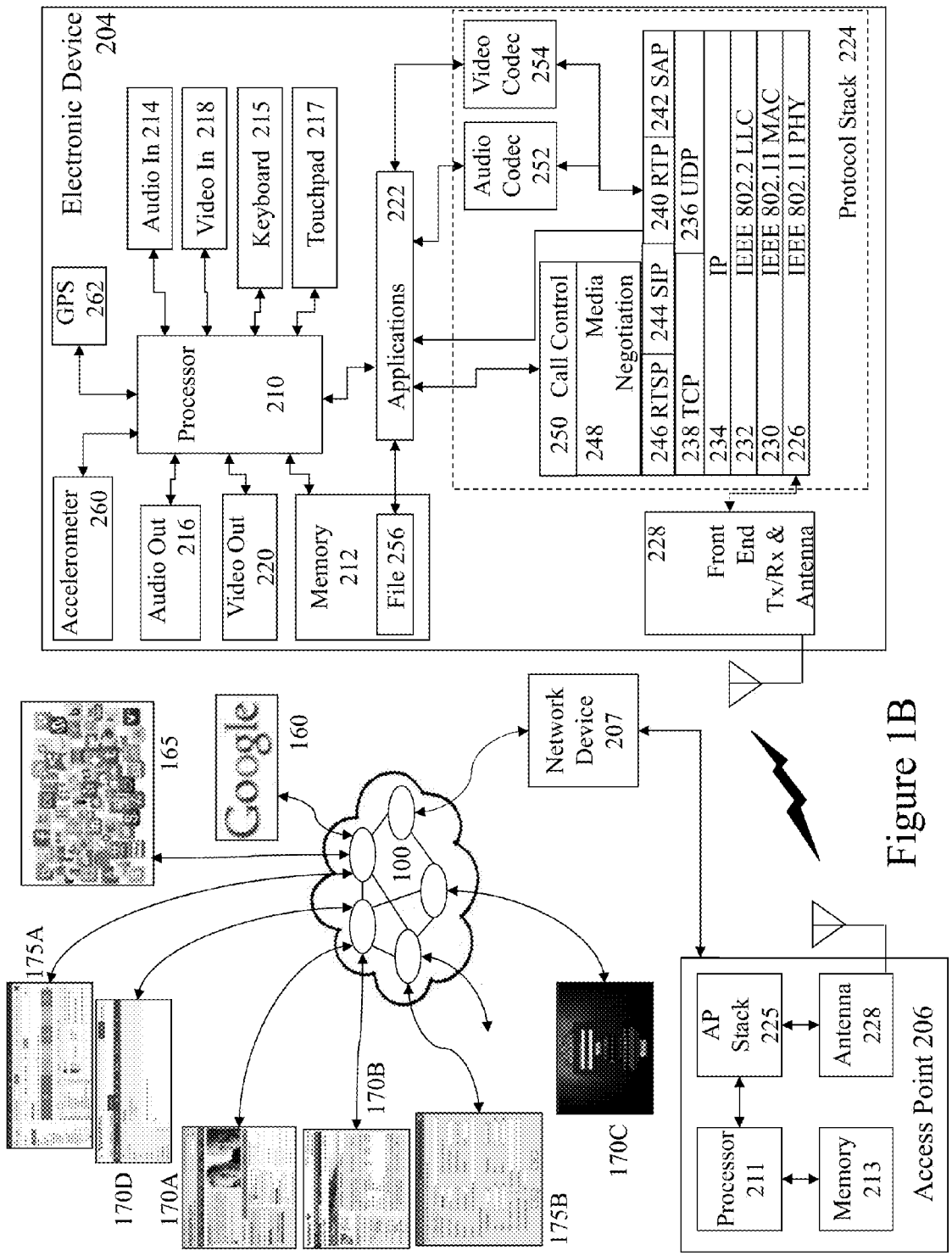
FIG. 1B depicts a wireless portable electronic device supporting communications to a network such as depicted in FIG. 1A and as supporting embodiments of the invention.

Now referring to FIG. 1B there is depicted an electronic device 204 and network access point 207 supporting PSPAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, such as Facebook™, LinkedIn™, first and second services 170A and 170B respectively, e.g. US Medicare.GOV and Bank of America™, online gaming website 170C, e.g. World of Warcraft™, cloud based email service 170D, e.g. Yahoo!™, customer resource management 175A, e.g. Streak CRM for Google Cloud, and digital document signature function 175, e.g. Adobe™ Acrobat, The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, nonvolatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Figure 1C:
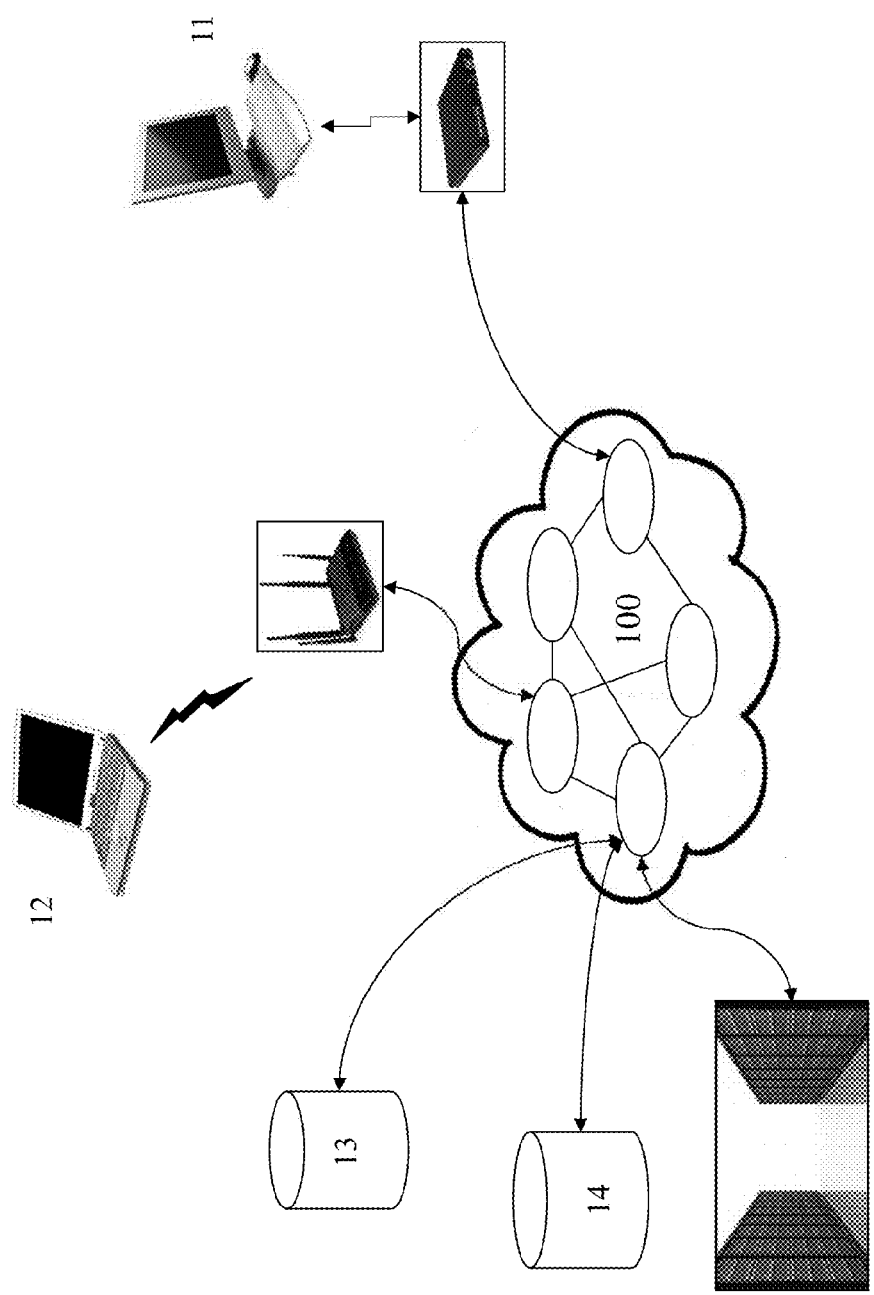
FIG. 1C depicts a simplified network environment within which embodiments of the invention may be employed.

According, referring to FIG. 1C there is depicted a simplified network diagram within which the embodiments of the invention are referenced. However, it would be evident to one skilled in the art that the embodiments are applicable to the more generalized network, servers, services, databases, PEDs, FEDs, etc. described supra in respect of FIGS. 1A and 1B. Accordingly, a wide area network, e.g. the Internet, is depicted as network 100 with a first computer system 11, e.g. PED or FED such as laptop 155, and a second computer system 12, e.g. PED or FED such as personal computer 115, in communication therewith together with first and second servers 13 and 14 respectively, e.g. first and second servers 190A and 190B respectively in FIG. 1A. The communication network supports communication between the first computer system 11 and the first server 13, between the first computer system 11 and the second server 14, between the second computer system 12 and the first server 13, and between the second computer system 12 and the second server 14. Further, more complex communications are possible such as from the first computer system 11 to the first server 13 and then to the second computer system 12. Of course, the first computer system 11 is able to communicate with the second computer system 12 as well, though this is less commonly direct.

Shown in FIG. 2A is a simplified diagram of a login screen 200 according to the prior art comprising a background 21, a user identifier 22, and a password entry text box 23. In order to login via the login screen 200, a user enters a password associated with the user identifier 22 into the password entry text box 23. In some systems, the user enters the user identifier into a user identifier text box (not shown). In other systems, the user selects a user identifier from a list. For example, to log into a Macintosh computer, a user selects the user that will log into the system from a list of available users and then enters a password associated with the selected user in a password entry text box. In other systems the user identifier defaults to the last user to login. Accordingly, the user to gain access to the application/service associated with the login screen 200 must as a minimum enter their password.

Shown in FIG. 3 is a simplified diagram of a user information entry screen 300 according to the prior art wherein a user information entry screen 300 is depicted for entering user information relating to a customer engaging in a purchase transaction. Text boxes are shown with labels therebeside. For example, text box 31 has the label first name, textbox 32 has the label last name, textbox 33 has the label shipping address, and textbox 34 has the label billing address. Other textboxes are often presented to allow for other data to be provided such as state, zip code, phone number, identification number, credit card number, credit card expiry date, credit card security number, etc. for a transaction to be completed, e.g. purchasing an item online. In other systems elements may be pre-filled, auto-filled etc. User information entry screen 300 may for example represent a checkout stage of a purchasing transaction of a user with a retailer accessed through login screen 200 wherein the user identifies themselves in the login screen allowing autofill options in user information entry screen 300. Optionally, user information entry screen 300 may alternatively lead to the user entering their registration details, e.g. user name and password in an account screen similar to that depicted as login screen 200.

Whilst user access screens, login pages, login screens, account entry screens, etc. may vary substantially in design, format, etc. they all feature the requirement for a registered user to enter their username (or its equivalent) and their password (or its equivalent security credential). In some the password may be augmented with additional data, such as depicted in FIG. 2B wherein after entering an identity in a previous screen the user is presented with fields relating to entering their verification answer 24 and also providing a security code 25. The security code 25 being a part of two-factor authentication to provide an added layer of protection in that not only must the user enter their identity, enter the verification answer, they must now also enter a personal identification number (PIN) into the security device to generate the security code 25. Two-factor authentication means you have both a piece of information, e.g. the PIN, but also something unique, e.g. the security device. In some systems the user identity and verification may grant the user a first level of access (either discretely or in combination with a further item of verification data) whilst the user identity, verification, and security code grant a second level of access unlocking for example features, resources, data, etc. inaccessible in the first level of access.

Figure 4:
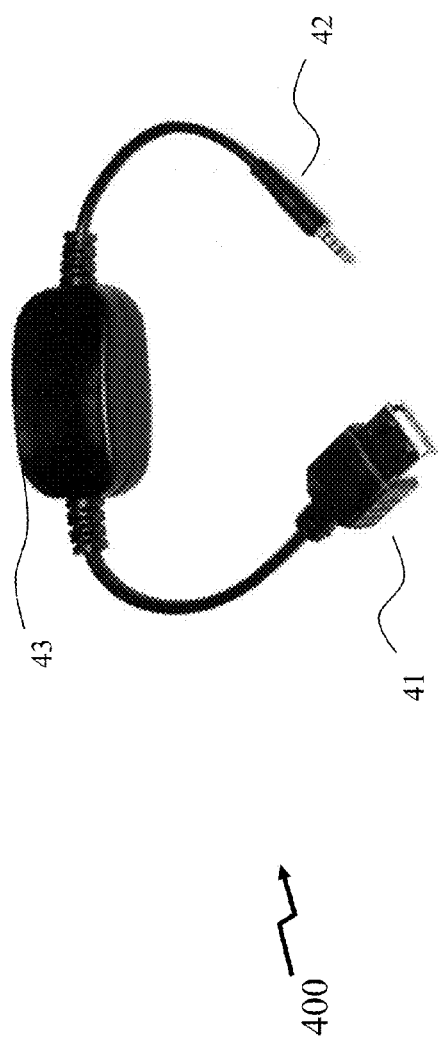
FIG. 4 is a simplified diagram of an interface cable according to an embodiment of the invention.

Referring to FIG. 4 there is depicted a USB to audio conversion assembly 400 comprising a Universal Serial Bus (USB) connector 41 at one end thereof, an audio jack 42, e.g. 3.5 mm audio jack as employed in most PEDs, laptops, etc., and a data adapter 43 therebetween. As will become evident in respect of embodiments of the invention described below the data adapter 43 provides functionality for enabling some embodiments of the invention to act as a password provider.

Figure 5A:
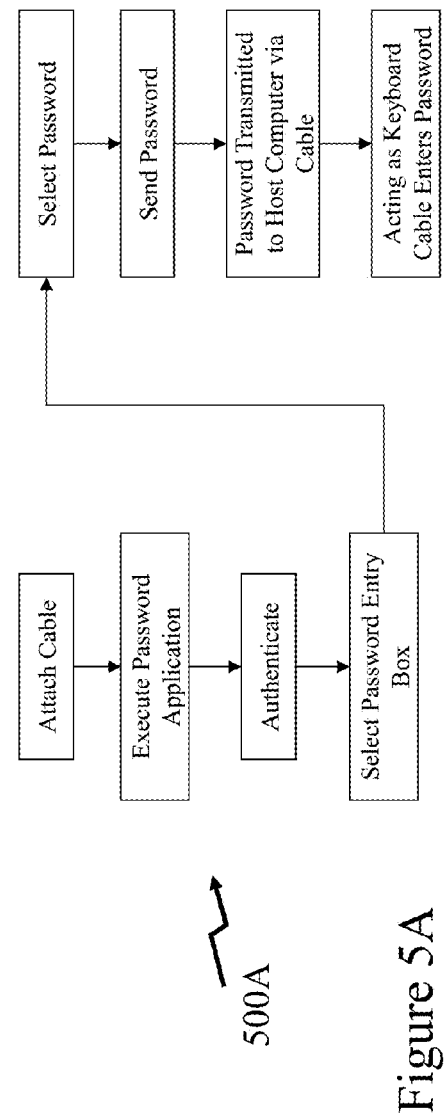
FIG. 5A is a simplified flow diagram of a method according to an embodiment of the invention.

Referring to FIG. 5A, shown is a simplified flow diagram of a method of entering a password into a password entry screen such as that of FIG. 2A, exploiting a password provider such as USB to audio conversion assembly (UACA) 400 according to an embodiment of the invention. Upon seeing the password entry screen 200 on the first computer system 11, a user attaches their PED, e.g. their smartphone, to the first computer system 11 via an interface such as USB to audio conversion assembly 400, for example. Accordingly, the USB connector is connected to the first computer system 11 whilst the audio jack 42 connects to the headphone port on their PED. The user then executes a PSPAP on their PED, selects an indication of the password entry screen 200 from a list of potential screens, and is prompted for an authentication code. The user selects the password entry dialog box on the password entry screen 200 and causes the PSPAP to unlock the password stored thereon, for example by providing an authentication code or a biometric credential, wherein the password is automatically provided from the PED via the UACA 400 to the password entry textbox. In such an example, the user need not know their actual password for the login screen 200, which can be one of a large number of long and complex passwords, but instead remembers the authentication code and/or provides a biometric credential as well as maintains physical security over their PED.

In some embodiments such as the flow diagram depicted in FIG. 5A, all passwords and data are stored within a single password data store accessed via a PSPAP on a single PED and are authenticated with a common authentication code. In other embodiments, different authentication codes may be relied upon for different password data which may, for example, be grouped as between work and personal or financial and non-financial. Some steps may be performed on the different systems, and although described in a particular order this can be rearranged into other sequences provided that the password is not released before the text box on a host computer, e.g. first computer system 11, is selected and the USB to audio conversion assembly 400 is installed.

Figure 5B:
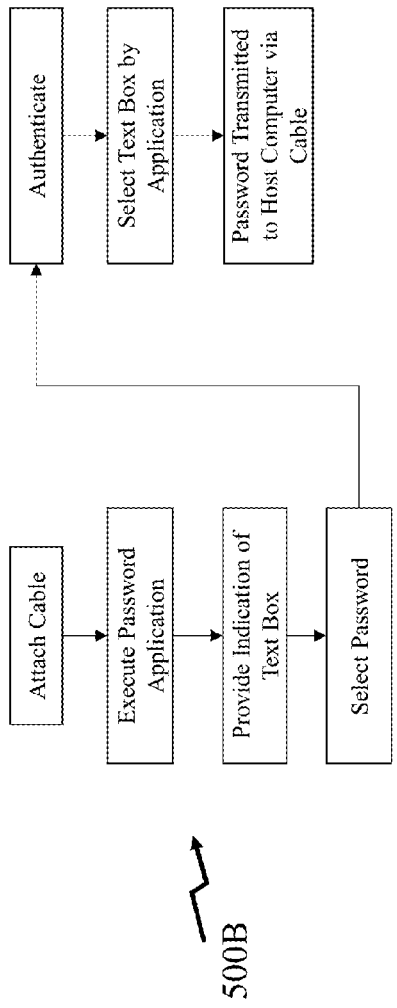
FIG. 5B is a simplified flow diagram of a method according to an embodiment of the invention.

Now referring to FIG. 5B, shown is a simplified flow diagram of a method of entering a password into a password entry screen such as that of FIG. 2A. Upon the user being presented with password entry screen 200, the user attaches their PED, e.g. smartphone, to the first computer system 11 upon which the application/service generating the password entry screen 200 is in execution or being accessed via an interface cable, e.g. UACA. The user then executes the PSPAP on their PED, selects an indication of the password screen 200 from a list of potential screens and is prompted for an authentication code. The user provides the authentication code to the PSPAP which either then automatically detects or is provided with an indication of where the password entry text box 23 is located on the password entry screen 200. The appropriate password may then be automatically provided to the password entry text box 23 of the password entry screen 200 from their PED via the UACA 400. For example, the UACA 400 may act as a haptic interface, e.g. a mouse, touchpad, etc., selecting the password entry text box 23 prior to providing the password data thereto.

For example, to illustrate in a non-limiting manner, consider a startup screen on an Apple Macintosh computer, the users are listed. The PSPAP is provided with a screen location for selecting the selected user which then opens a password text box at a predetermined location. The application then enters the password into the text box at that location. This can be repeated each time the screen is locked as well.

As another non-limiting example, a password entry window for a server is provided on an access screen. As the password entry window is consistent, once its upper left hand corner location on the screen is known, or another location on the screen, the text box location is detectable. Therefore, once the window location is known, the text box is automatically selectable and enterable.

Figure 5C:
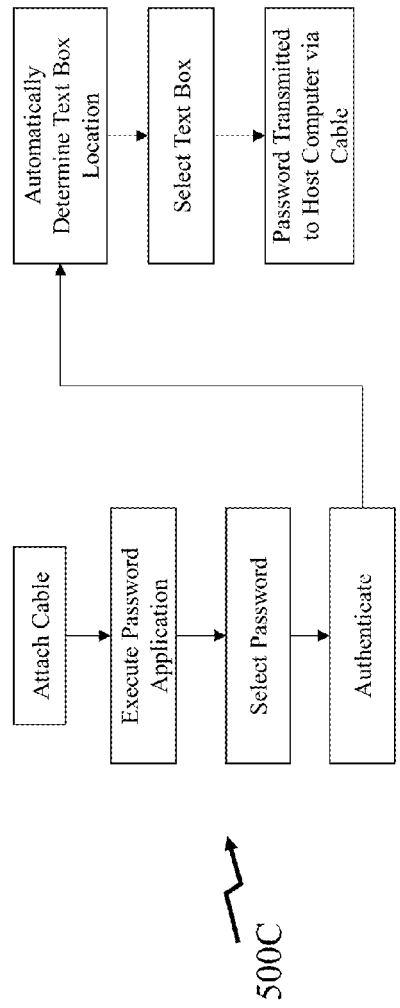
FIG. 5C is a simplified flow diagram of a method according to an embodiment with automatic field detection.

Referring to FIG. 5C, shown is a simplified flow diagram of a method of entering a password into a screen such as that of FIG. 2A. Upon seeing the password entry screen 200, a user attaches their PED, e.g. their smartphone, to the first computer system 11 via an interface cable, e.g. UACA 400, such that the audio jack of the PED is connected to a USB port of the first computer system 11. The user then executes a PSPAP on their PED and is prompted for an authentication code. The PSPAP determines that a password entry textbox on the password entry screen 200 exists and then determines where the textbox for password entry is located, for example using graphical and/or image analysis of the screen. The PSPAP then selects the textbox for password entry. Once the user has provided the appropriate authentication code to the PED then the password associated with the application and password entry screen 200 is automatically provided to the password entry text box 23 of the password entry screen 200 from the PED via the UACA 400 to the first computer system 11.

In some embodiments, in order to determine where the password entry textbox 23 is located, the application in execution on the first computer system 11 communicates with the PSPAP via the UACA 400. Alternatively, the PSPAP uses visual recognition/image analysis to identify a location within the password entry screen 200/display the password entry text box 23 is located. Such techniques being known within the art and being generally simplified by the fact that the password entry text box 23 is a blank rectangular region within the password entry screen 200. Alternatively, at least one of the password entry screen 200 and the password entry text box 23 comprises alignment markers for identification by the PSPAP, allowing entry of password data into the password entry text box 23 at the correct location, for example to allow pointer selection of the password entry text box 23. Optionally, the alignment markers also identify the password entry text box 23 and which password data is associated therewith. In some embodiments, when automation is employed to identify the password entry text box 23 within the password entry screen 200, verification of the determined password for entry from the PSPAP is employed to prevent a spoofing attack.

When all passwords within the PSPAP are secured with a common password/credential then optionally authentication may be performed only once upon PSPAP execution/initialization. Alternatively, authentication is performed at PSPAP execution/initialization and then again each time a password is to be retrieved. Alternatively, authentication requirements may be configurable by the user of the PSPAP.

In some embodiments, the PSPAP is executed and an image of the computer/device screen is captured. The PSPAP then extracts data entry box locations within the screen for which it has data or potentially has data and prompts the user to authorize provisioning of the data to the screen. Optionally, this methodology can be extended to two or more application screens simultaneously displayed upon the device screen. Accordingly, as an example a user may be shopping at two online sites at once, then by opening the two checkout windows simultaneously and visibly, the PSPAP could extract the address, credit card, and other text entry fields and offer to populate them to both online retailers with a single authentication. Alternatively, separate authentications may be provided for each window.

Figure 6:
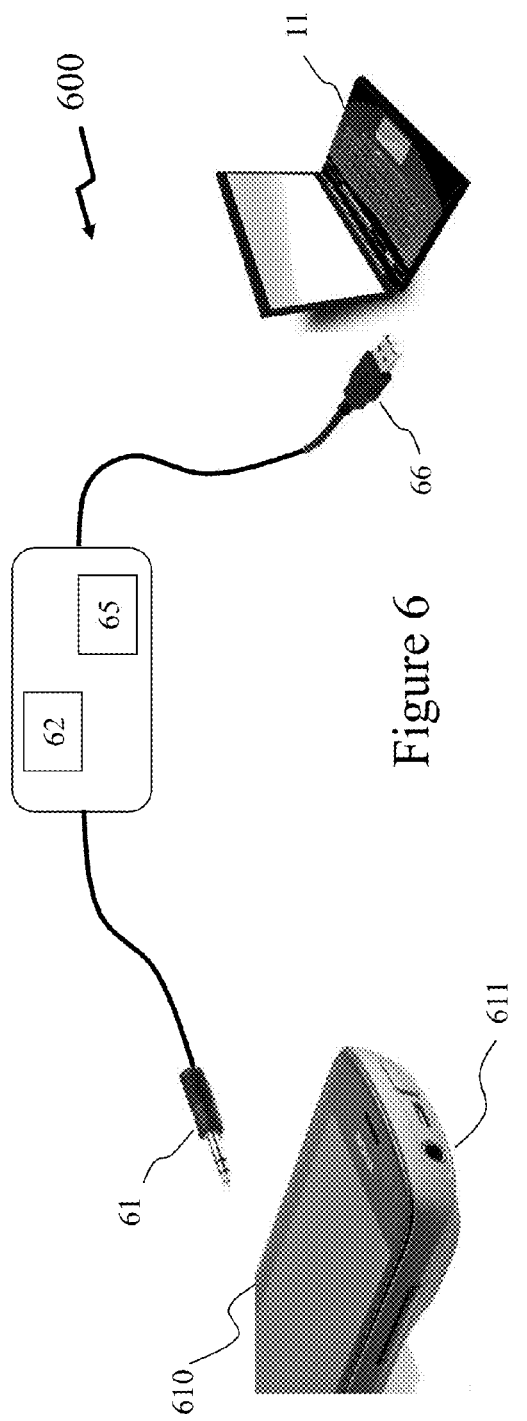
FIG. 6 is a diagram of an interface cable interfacing between a smartphone and a host computer system according to an embodiment of the invention.

Referring to FIG. 6, shown is an apparatus for providing password data to a first computer system 11 via a USB audio converter assembly (UACA) 600 for interfacing with a headphone output port 611 of mobile phone 610, as an example of a PED and/or FED. A headphone connector 61 interfaces with the headphone output port 611 to receive audio signals provided at the headphone output port 611 of the mobile phone 610. The UACA 600 comprises the headphone connector 61 at one end thereof and USB connector 66 at the other end thereof. Sound signals received at the headphone connector 61 are provided to a sound to digital converter (SDC) circuit 62 where the sounds are converted into a digital signal for mimicking control transducer input signals for controlling first computer system 11. For example, the control transducer input signals may mimic user key entry on a keyboard. Alternatively, the control transducer input signals may mimic a keyboard and a mouse. As it is common to interface keyboards, mice, tablets, etc. to a FED or PED such as a laptop via a USB interface, mimicking a keyboard, mouse, or another haptic peripheral is relatively straightforward once the digital signals for each key are known.

Accordingly, each USB digital data sequence for a particular keyboard value, e.g. lower case a, upper case A, or the 4 and $ of the same key wherein the later includes a shift key operation, are stored within the UACA 600 with an associated audio signal. Each audio signal from the PED, e.g. mobile phone 610, is then converted by the SDC circuit 62 into a key press equivalent digital signal for provision to the USB port of the first computer system 11. For example, when the password is "HelloWorld!" the mobile phone outputs a sequence of sounds that are mapped in sequence to digital signals mimicking a keyboard having the keys H, e, l, l, o, W, o, r, l, d, and ! pressed in sequence. This results in provision of the password "HelloWorld!" to the selected entry box of the first computer system 11. Thus selection of a textbox for receiving the password allows for provision thereof directly to the correct textbox without requiring a user to enter the password or even to know the password itself.

Wireless data communication is useful for replacing portions of UACA 600. In some embodiments, UACA 600 includes a USB adapter 66 for coupling with the first computer system 11, the SDC circuit 62, and a Bluetooth™ circuit 65 for mimicking a Bluetooth™ speaker for receiving the sound signal from the mobile phone 610 wirelessly. Alternatively, another sound communication standard such as Airplay™ may be supported. Optionally, other short range or near field communication standards may be employed rather than Bluetooth™.

Figure 7:
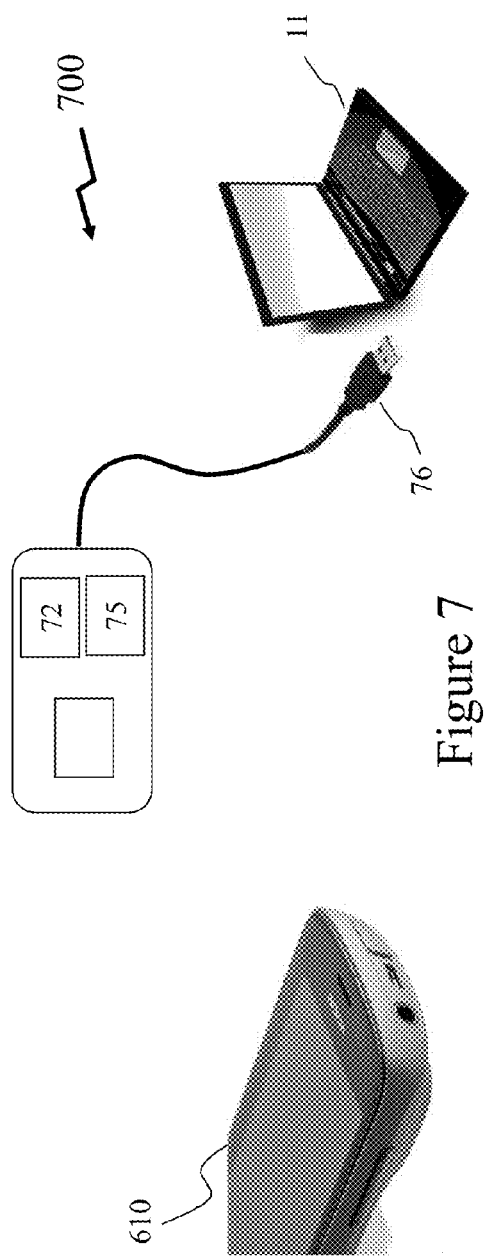
FIG. 7 is a diagram of an interface cable supporting a wireless coupling between a smartphone and a host computer system according to an embodiment of the invention.

Referring to FIG. 7, an alternative USB Audio Converter Assembly (UACA) 700 is depicted which includes Bluetooth™ speaker emulator circuit (SEC) 75. The Bluetooth™ SEC 75 communicates with the mobile phone 610 via the Bluetooth™ communication standard to receive audio signals therefrom. Other wireless, optical, and near-field communication standards for communicating the audio signal are employable. The mobile phone 610 communicates with the Bluetooth™ SEC 75 via one such wireless communication standard obviating the requirement for a wired coupling with the mobile phone 610. The Bluetooth™ SEC 75 is coupled to the SDC circuit 72, which is itself coupled to the first computer system 11 via the USB port and USB connector 76. Similar to the UACA 600 of FIG. 6, the SDC circuit 72 mimics a data entry transducer in the form of a keyboard to convert sound signals received into keystrokes representing data for entry into the first computer system 11. Thus, the Bluetooth™ communication standard replaces the wired connection to the mobile phone 610 shown in FIG. 6. The first computer system 11 is provided with a simple dongle supporting Bluetooth™ sound signal to keyboard key press conversion and keyboard mimicking allowing for wireless convenience in some situations.

Referring to FIG. 8, shown is a simplified method of registering a user to the PSPAP in execution upon their PED, e.g. mobile phone or smartphone. A user installs the PSPAP on their smartphone. The PSPAP when executed asks the user for a variety of personal information. For example, the user is asked for their first, middle, and last names, their address, their age and birth date, their social security number, their driver's license number, their passport number, their frequent flyer numbers, their credit card numbers, etc. In some embodiments, web sites are selected by the user from a list and all data for each site is requested. Optionally, a single datum is only requested once and is reused for different sites. Once personal data is populated, the user is provided an opportunity to enter password entry screen identifiers and related passwords. Alternatively, the current passwords are entered and the PSPAP generates new more secure passwords that are not known to the user. Further alternatively, the current passwords are entered and the PSPAP generates new more secure passwords that are known to the user. Within another embodiment of the invention, as the user registers with new websites, services, applications, etc. the PSPAP may automatically generate a password for these. Within another embodiment of the invention during the configuration the user may establish one or more user identities which may also be automatically used as part of a registration process with a new website, service, application, etc. Accordingly, wherein a user is already registered, most of the text boxes for websites, services, applications, etc. can be automatically filled in or semi-automatically filled in using the PSPAP and in other instances most of the registration details for websites, services, applications, etc. may be similarly automatically filled in or semi-automatically filled in using the PSPAP.

Referring to FIG. 9, shown is a simplified method of entering personal data on a web site from the PSPAP relying on the interface cable. A webpage is displayed requiring entry of personal data. A user couples their PED, e.g. smartphone, to the computer system, e.g. first computer system 11, to support communication via the headphone jack between the PED and the first computer system 11. The user then selects a text box within a displayed web page and selects a datum from the PSPAP to provide to that text box. The user then authenticates this in order to initiate release of the datum to the web page from the PED via the computer system and UACA such that the data is populated within the web page text box. The USB connector of the computer system provides electrical data such that the first computer system interprets the data as coming from a keyboard, but is in fact mimicked by the USB Audio Converter Assembly (UACA), e.g. UACA 600 or UACA 700 in FIGS. 6 and 7 respectively. In some embodiments, data may be released without authentication, for example, public data or data that is not secured. In some embodiments some data may be released with a first level of authentication whilst other data may require a higher level of authentication. For example, the first level may be audio pattern recognition of a phrase spoken by the user via the microphone of the PED whilst the second level is a visual image match of the user via the camera of the PED.

Referring to FIG. 10, shown is a simplified method of entering personal data on a web site from the PSPAP. A webpage is displayed requiring the entry of personal data. A user couples their PED, e.g. smartphone, with the computer system, e.g. first computer system 11, to support communication via the headphone jack between the PED and the first computer system 11 via the UACA. The user then captures an image of the displayed web page on the PED which is analyzed and the data fields to be filled in, i.e. the text boxes for which data is required, are identified together with the application, company, service, etc. to which the login page relates. This allows the PSPAP to identify the appropriate data for provisioning. The user then authenticates to allow release of the data to the web page and the data is populated within the web page text boxes. The USB connector of the computer system again provides data such that the computer system interprets the presence of a keyboard and a mouse such that the UACA can select each text box and enter data. In some embodiments, data is released without authentication, for example, public data or data that is not secured. In some embodiments, the web page is encoded for easily being discerned by the PSPAP; for example, a two dimensional barcode is used to identify the name of each field, the field ordering within the web page, and in registration page instances any limitations on identity, password etc. such as for example, an identity must be an email account whilst an identity must be minimum of 8 characters, including at least one upper case, one number, and one special character (e.g. @, #, $, %, &,*, !, and +).

Optionally the visual code, e.g. two dimensional barcode or equivalent optically interpretable code, displayed upon the second device is generated by a plug-in in execution upon the second device that identifies navigation to a web site and/or web page, correlates the web site and/or web page with a database of known web sites and/or web pages having known text entry fields, and upon determining a correlation triggers generation of the visual code from a library or store of visual codes or generates the visual code directly. Optionally, the image analysis performed in the simplified method of entering personal data on a web site from the PSPAP in FIG. 10 via image analysis of a web page may perform image analysis for a logo and therefrom derive the visual code, e.g. two dimensional bar code.

Figure 11:
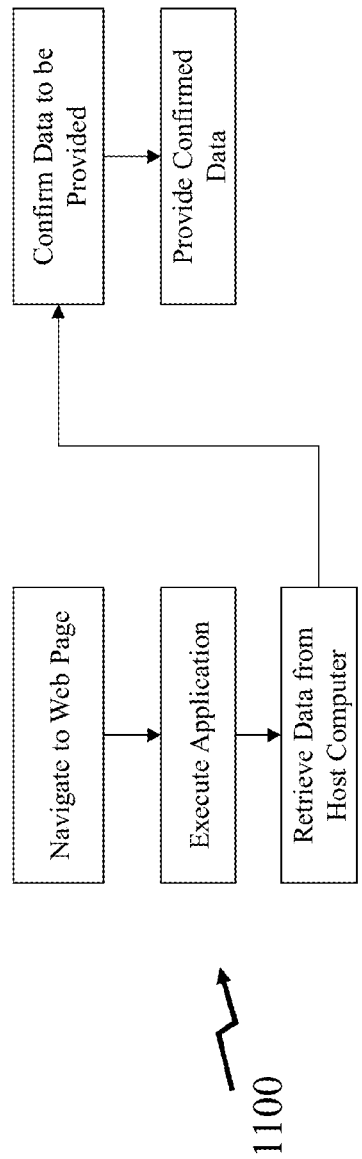
FIG. 11 is a simplified flow diagram of a method of using an app that extracts from a host computer fields to fill in in order to provide data to a host computer system according to an embodiment of the invention.

Referring to FIG. 11, shown is a simplified method of entering personal data on a web site from the PSPAP relying on the headphone jack. A webpage is displayed requiring the entry of personal data. A user couples their PED with the computer system, e.g. first computer system 11, to support communication via the headphone jack between the smartphone and the computer system. The PSPAP then retrieves from the computer system data relating to the web page being displayed and the data fields to be filled in and for which data is stored are identified. The user then authenticates to allow release of the data to the web page and the data is populated within the web page text boxes. The USB connector of the computer system again mimics the presence of a keyboard and a mouse. The "mouse" selects each text box and the "keyboard" fills in the text data. In some embodiments, data is released without authentication, for example, public data or data that is not to be secured. In some embodiments, the web page indicates status to determine if it is in a default condition or not, allowing the tab key, for example, to be used to navigate without knowing exact screen coordinates for the displayed web page window.

Figure 12:
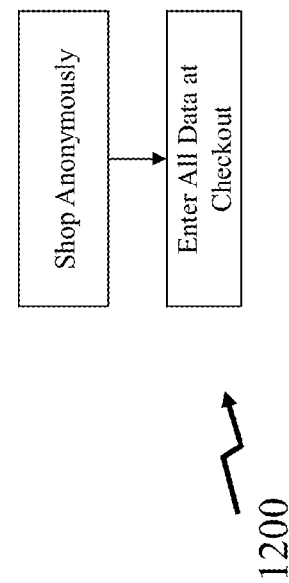
FIG. 12 is a simplified flow diagram of a method of virtual registration with web servers according to an embodiment of the invention.

Referring to FIG. 12, shown is a method of private registration for use with a web site. Here, the PSPAP has a web site configuration. The user fills in all the information for that web site configuration. For example, for Amazon.com, the configuration includes, name, address, credit card data, shipping address, etc. The user then shops anonymously at Amazon.com, for example, on a public computer. The user is able to fill a cart and proceed to checkout. At checkout, the user authenticates to their PED, and the information on all subsequent screens is automatically populated resulting in an experience of being registered with Amazon.com without actually requiring registration. The result allows for confidentiality of users except when an actual purchase is made. Because the user's personal and financial information are stored locally on their PED, their data need not be released into the cloud per se but only to the retailer they are purchasing from. For example, a one-time code is provided by their bank to authorize a purchase so they need not provide a credit card number. In such a case, the PED PSPAP could access the bank directly and retrieve the code in response to the purchase data provided, either by having the user enter the purchase price or by communicating the purchase price from the vendor to the PED. Once the bank has authorized the transaction, a code is provided to the vendor to guarantee payment. In this fashion, the PSPAP allows for distributed transaction processing, password distribution, distributed authentication/authorization and so forth.

Figure 13A:
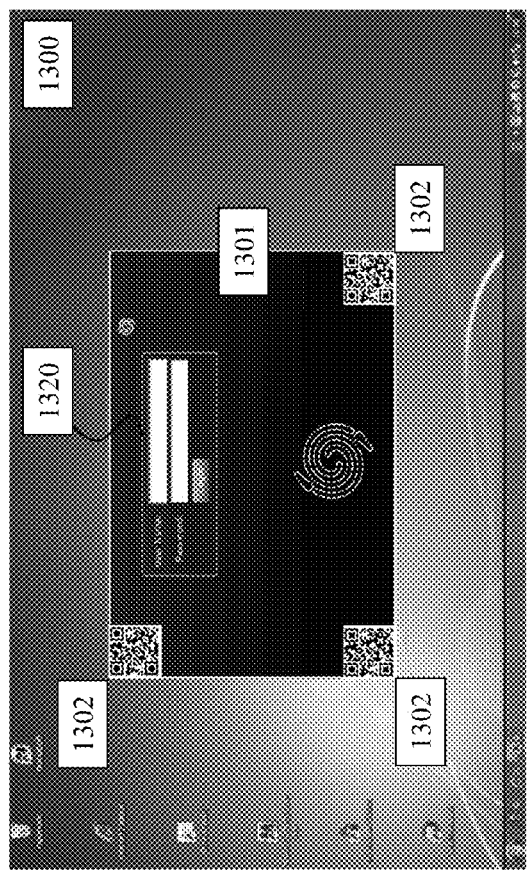
FIGS. 13A and 13B depict simplified diagrams of display screens within windows having encoded data for encoding information about the window in the form of 2D bar codes according to an embodiment of the invention.
Figure 13B:
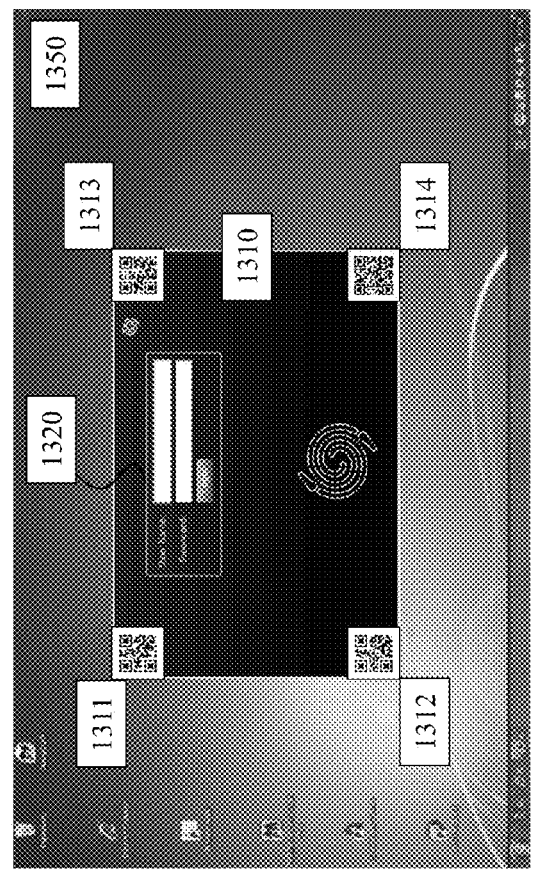

Referring to FIG. 13, shown is a web page 1301 on a screen 1300 which has encoded within bar codes 1302. Accordingly, three corners of the web page comprise alignment symbol in the form of a 2D bar codes 1302, e.g. Quick Response (QR) codes. However, also stored within each alignment symbol data relating to input boxes and in some embodiments their required and/or auto-populated content for the entry region 1320. As such, a visual capture of the web page 1301 or a portion thereof allows the PSPAP to orient and locate the webpage 1301 relative to the screen 1300 and the text boxes relative to the web page 1301 before proceeding to generate the data for entry into the appropriate entry fields in an automated fashion. Of course, semi-automated data entry, where a user authenticates and then clicks on each entry field and then the data for said entry field is transmitted is also supported. In some embodiments, authenticating to the PED PSPAP results in access to numerous data fields in succession without re-authenticating. In the example where the web page being displayed is known to the PSPAP, either because the user has indicated such or the PSPAP has determined it, the fields for that web page become accessible in response to a single authentication either in a predefined order or in an order selected by the user. Within FIG. 13A each of the three bar codes 1302 is identical so that partial or complete obscuration of one or two bar codes 1302 by another overlaying webpage does not impact the data entry process. Referring to FIG. 13B a webpage 1310 upon a screen 1350 is depicted but now webpage 1310 has first to fourth bar codes 1311 to 1314 respectively. In this embodiment each of the first to fourth bar codes 1311 to 1314 respectively is different but now each of the first to fourth bar codes 1311 to 1314 respectively contains less data and may be, for example, Version 1 QR Codes (21x21), containing 10 alphanumeric elements at high (H) error correction levels. In contrast, each bar code 1302 in FIG. 13A may be a Version 4 QR code (33x33) containing 50 characters at the sameHerror correction level. Optionally, the bar codes 1302 and/or first to fourth bar codes 1311 to 1314 respectively in FIGS. 13A and 13B respectively may be another code type including, but not limited to, 1D bar codes, UPC-A bar code, EAN-13 bar code, micro-QR codes, EZcode, high capacity color barcodes, MaxiCodes, and ShotCodes.

Alternatively, data transfer may be effected using the speaker output port of a PED and a microphone port of a computer system, e.g. first computer system 11. The sound processing is then performed on the computer system to extract the data. As the sound is electronically generated by the PED, a text to speech/speech to text process may, for example, be employed to accurately transmit the data between the systems. In order to protect the data one or more standard encryption techniques as known within the prior may be employed, or alternatively, the PED speaker may be placed close to the computer system microphone. In contrast to other embodiments described supra, such a method would have software installed on the computer system.

Referring to FIG. 14, there is depicted a simplified flow diagram of a method of creating a one-time password system from a user accessible system. A user retrieves a password associated with a system on their PED. The password is optionally automatically provided for gaining access. Alternatively, the password is displayed for manual provision to the system. Once the system receives the password, the system is accessed directly by the PED and the password is changed. The new password is stored in the password data store for use next time the system is to be accessed. In this way, the same password does not operate twice with a server or web site, but the user need not have server specific synchronization hardware for accessing same. Further, when passwords are automatically provided, the passwords generated can be arbitrarily complex so long as their character sets are supported by keyboard entry devices and the application, software, system, service etc. to which they are being entered. Accordingly, passwords can become as complex as software authorization codes, for example.

Referring to FIG. 15A, shown is a simplified block diagram of a USB device 1500 for wireless communication and for providing data entry via a user input interface in the form of a keyboard interface for a computer system. The USB device 1500 includes a USB connector 1501 at one end thereof, a processor 1502, and a wireless receiver circuit 1503. Optionally, the wireless receiver circuit 1503 may be a wireless transceiver circuit for bidirectional communication.

Referring to FIG. 15B, shown is a simplified block diagram of a wireless device 1550 for wireless communication and for providing data entry via a user input interface in the form of a keyboard interface on a computer system. The wireless device 1550 includes a Bluetooth™ interface 1551 for coupling with the computer system, e.g. first computer system 11, and a processor 1502 therein. The wireless device 1550 also includes a wireless receiver circuit 1503. Optionally, the wireless receiver circuit comprises a wireless transmitter circuit for bidirectional communication. Though the embodiments that follow are described with reference to USB device 1500, wireless device 1550 is interchangeable therewith allowing for true wireless application of the solution when desired.

Referring to FIG. 16A, shown is a simplified flow diagram of a method of entering a password into a password entry screen such as that of FIG. 2A. Upon seeing the password entry screen 200 on the computer system, e.g. first computer system 11, a user couples their PED to the USB device 1500 via a wireless communication protocol in the form of Bluetooth™, for example. For example, there is a low power variant of Bluetooth well suited to short-range wireless communication. Optionally, another form of near field communication (NFC) is used. The user then executes a PSPAP on the PED, selects an indication of the password entry screen 200 from a list of potential screens and is prompted for an authentication code. The user selects the password entry dialog box on the password entry screen 200 and causes the PSPAP to unlock the password stored thereon, for example by providing another authentication code; the password is automatically provided from the smartphone via the wireless interface to the USB device 1500 which then provides the password to the password entry textbox via the keyboard interface.

Optionally, the password is secured during wireless communication thereof. In such an example, the user need not know their actual password, which can be long and complex and instead merely remembers the authentication code for the password application and maintains physical security over their PED. In some embodiments such as the flow diagram shown in FIG. 16A, all passwords and data within a single smartphone password data store are authenticated with a same authentication code. In other embodiments, different or multiple authentication codes are relied upon for different data. Some steps carried out on the different systems, though described in a particular order can be in arbitrary order, so long as the password is not provided to the computer via the keyboard interface before the text box on a host computer is selected and the communication is established. Optionally, authentication may be provided via biometric data.

Referring to FIG. 16B, shown is a simplified flow diagram of a method of entering a password into a password entry screen such as that of FIG. 2A. Upon seeing the password entry screen 200, a user couples their PED to the computer system, e.g. first computer system 11, via a wireless interface and USB device 1500. The user then executes a PSPAP, selects an indication of the password screen 200 from a list of potential screens and is prompted for an authentication code. The user provides the authentication code to the PSPAP and the PSPAP detects or is provided an indication of where the password entry text box 23 is located on the password entry screen 200; then, the password is automatically provided to the password entry text box 23 of the password entry screen 200 from the smartphone via the USB device 1500. For example, the USB device 1500 acts as a mouse and selects the password entry text box 23 prior to providing the password data thereto.

As a non-limiting example, for a startup screen on a Macintosh computer, the users are listed. The PSPAP is provided with a screen location for selecting a selected user, which then opens a password text box at a predetermined location. The application then enters the password into the text box at that location including selecting the text box when necessary. This can be repeated each time the screen is locked with minimal inconvenience to a user.

As another non-limiting example, a password entry window for a server is provided on the screen. As the password entry window is consistent, once it's upper left hand corner location on the screen is known (or another location on the screen), the text box location is determinable. Therefore, once the window location is known, the text box is automatically selectable and enterable.

Referring to FIG. 16C there is depicted a simplified flow diagram of a method of entering a password into a screen such as that of FIG. 2A. Upon seeing the password entry screen 200, a user couples their PED to the computer system, e.g. first computer system 11, via a wireless interface in the form of USB device 1500. The user then executes a PSPAP on the PED, e.g. their smartphone, and is prompted for an authentication code. The PSPAP determines a password entry textbox on the password entry screen 200 and where the textbox for password entry is located, for example using graphical analysis of an image of the screen. The PSPAP selects the textbox for password entry. The user provides the authentication code to the smartphone and an associated password with the password entry screen 200 is automatically provided to the password entry text box 23 of the password entry screen 200 from the smartphone via the wireless interface. For example, the USB device 1500 receives a secure communication from the smartphone including the password and then the USB device 1500 provides the password to the identified text box via a keyboard interface.

In some embodiments, in order to determine where the password entry textbox 23 is located, the application in execution on the computer system, e.g. first computer system 11, communicates with the PSPAP via the wireless interface. Alternatively, the PSPAP uses visual recognition to identify a location on the password entry screen 200 where the password entry text box 23 is located. Further alternatively, one of the password entry screen 200 and the password entry text box 23 comprises alignment markers for being identified by the PSPAP, allowing entry of password data into the password entry text box 23 at a correct location, for example to allow pointer selection of the password entry text box 23. Optionally, the alignment markers also identify the password entry text box 23 and which password data is associated therewith. In some embodiments, when automation is employed to identify the password entry text box 23 within the password entry screen 200, verification of the determined password for entry from the PSPAP is employed to prevent spoofing.

When all passwords within the PSPAP are secured with a same password, optionally authentication is performed only once upon PSPAP execution. Alternatively, authentication is performed at PSPAP execution and then again each time a password is retrieved. Further alternatively, authentication requirements are configurable by a user of the PSPAP.

In some embodiments, the PSPAP is executed and screen image is acquired. The PSPAP then extracts data entry boxes within the screen for which it has data or potentially has data and prompts the user to authorize provision of the data to the screen(s). Thus, if shopping at two online sites at once, by opening two checkout windows simultaneously and visibly, the PSPAP could extract the address, credit card, and other text entity fields and offer to populate them all with one authentication. Alternatively, separate authentications are required for each data entry window. Further alternatively, separate authentications are required for some data within a same window.

Referring to FIG. 17, shown is a USB Password Provider (UPP) system according to an embodiment of the invention for providing password data to the computer system, e.g. first computer system 11, via a wireless interface in the form of a USB device 1700 for interfacing wirelessly with a mobile phone 610. A low power Bluetooth wireless interface circuit 1701 is provided for communicating with the mobile phone 610. The low power Bluetooth wireless interface circuit 1701 is coupled to a processor 1702 for optionally providing security to the wireless communication. The processor 1702 mimics a data entry device in the form of a keyboard and provides data in accordance with a USB keyboard standard via USB interface port 1703. Alternatively, signals provided via USB interface port 1703 mimic a keyboard and a mouse. As it is common to interface a keyboard and a mouse with a computer via USB, mimicking a keyboard is relatively straight forward once the digital signals for each key are known. Thus selection of a textbox for receiving the password allows for provision thereof directly to the correct textbox without requiring a user to enter the password or even to know the password itself. Further, once a mobile communication device has coupled to the USB device 1500, wireless password entry is supported via that USB device 1500 whenever it is within reliable communication range of the mobile communication device.

Referring to FIG. 18, shown is a simplified method of entering personal data on a web site from the PSPAP relying on the wireless interface. A webpage is displayed requiring entry of personal data. A user couples their PED, e.g. smartphone, with the USB device 1500 to support wireless communication therebetween. USB device 1500 is coupled to computer system, e.g. first computer system 11. Optionally, wireless device 1550 is coupled via a wireless communication standard such as Bluetooth™ supporting transducer data input in the form of keyboard data. The user then selects a text box within a displayed web page and selects a datum from the PSPAP to provide to that text box. The user then authenticates in order to initiate release of the datum to the web page from the smartphone to the USB device 1500 and then to the computer system and the data is populated within the web page text box. The USB connector of the computer system sees a keyboard. In some embodiments, data is released without authentication, for example, public data or data that is not secured. Alternatively, wireless device 1550 is used and emulates a wireless data entry device such as a Bluetooth keyboard emulator.

Personal data is entered using the USB device 1500 or the wireless device 1550 analogously to the method described with respect to FIG. 10 and FIG. 11, though communication does not rely on an audio output of the mobile communication device.

Private registration as described with reference to FIG. 12 is also supported by the USB device 1500 and the wireless device 1550. Further the devices 1500 and 1550 support bar codes and one-time passwords as described above.

Referring to FIG. 19, shown is a simplified flow diagram of a method of automatically extracting web page bar codes. A plug-in is installed on the computer system, e.g. first computer system 11. When a web page is addressed, the plug-in searches for said web page within its database. When found, a barcode associated with that web page is provided on the display. Thus, a user need only capture an image of the barcode, i.e. using a camera on their PED, in order to access correct data to fill in the text boxes therein. This prevents spoofing and simplifies use. Alternatively, the plug-in communicates via a wireless standard with the mobile phone in order to identify the web page and text entry requirements thereto. As noted supra the barcode may be one of a range of 1D or 2D barcode formats.

Referring to FIG. 20, a database of supported entry screens is provided. For each, a visual indicator in the form of a QR code is provided, for example. The user prints the QR codes and can simplify password access for each authentication interface. For example, today, a user has the password for their Windows® Login Screen written down on a notepad in their right hand top drawer. Instead, the user replaces this with a note saying Windows™ Login Screen and a QR code. Nothing on the note contains any security information for accessing the Windows operating system of the user. That said, the user arrives at work, looks in the top right hand drawer (as they do every day), images the note on their PED, and is asked for authentication by their smartphone which then provides the password to Windows™. Thus, a common and existing process is almost unchanged, but security is vastly improved. Further, when the PED supports biometrics, simplicity can be further enhanced, as the user need not remember a password at all. Subsequently, if a third party accesses the note then all that will happen is their PED will either not recognize the information within or if they have the PSPAP seek to provide their own credentials.

Referring to FIG. 21, shown is a method of using bar codes with the password application to support an application where both the user and the resulting system need to be identified. For example, a parking spot is encoded with a bar code. The user then images the bar code which results in some of the data within a data entry screen being filled in, here it is the location of the parking spot, and then authentication allows further information to be filled in, e.g. payment information. Now the payment is specific to the spot as the barcode identified the spot and is also specific to the user as it comes from their secure data store on their PED.

One recorded, the parking spot is paid for by said user. For example, the user information includes a license plate number of the car. The resulting system allows for data entry within a generic system of data unique to the user and secured thereby, unique to the user and unsecured, and unique to the bar code or QR code such as the parking spot identifier. Similar systems support all kinds of user reservation, registration, and rental applications as well as door access, system login, etc. By including unique data within each QR code, the data entry system is customized to that QR code or its related product or service. Then the user data entry allows for customization of user data to the specific user. Thus, transactional processes are supported in a relatively automated fashion by the mobile phone application as described above.

Figure 22:
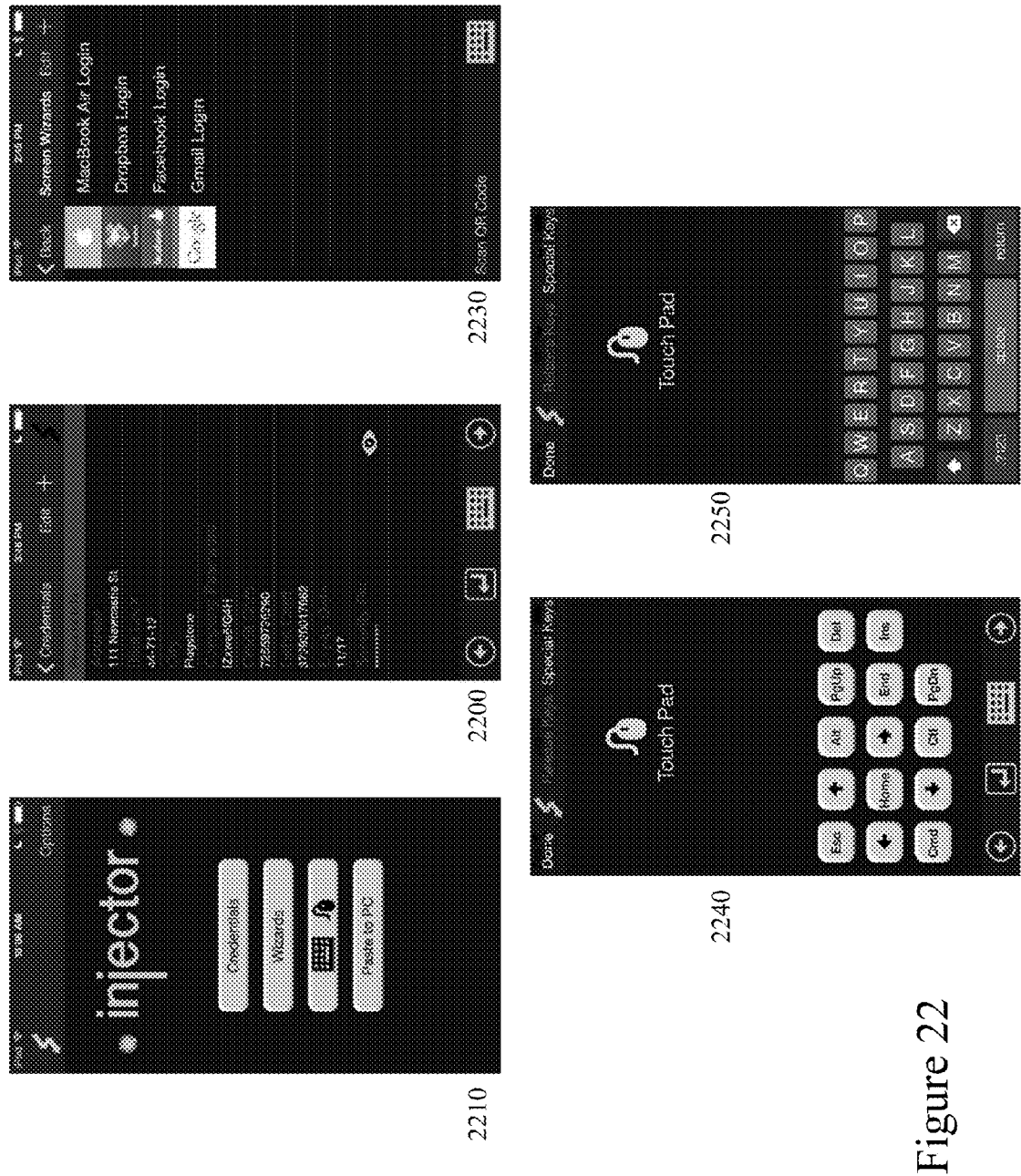
FIG. 22 depicts exemplary screen images from a PSPAP according to an embodiment of the invention.

Now referring to FIG. 22 there are depicted first to fifth exemplary screen images 2210 to 2250 for a PSPAP according to an embodiment of the invention. First screen image 2210 presents a menu screen to a user allowing them to select different functional options, such as:
 "Credentials" which links the user to second screen image 2220 with a list of elements and their values that have been stored within the PSPAP;
 "Wizards" which links the user to third screen image 2230 that provides automated functions for the user, such as depicted with automated logins for MacBook Air, Dropbox, Facebook, and Gmail;
 "Keyboard-Mouse" which links the user to third screen image 2240 and therefrom by selection of the keyboard icon on the bottom of third screen image 2240 with fourth screen image 2250, wherein third screen image 2240 provides the user with the ability using a touchscreen on their PED to move their finger and mimic to the computer system movement of a mouse together with specific mouse/keyboard functions whilst fifth screen image 2250 presents the user with keyboard on their PED such that as they type the PSPAP mimics a keyboard to the computer system.

Wizards are beneficial to users for web site form filling and logins. Typically a PSPAP will be able to access downloadable wizard templates for the user to choose from. Each wizard template contains place holders for credential items that the user selects from their credential sets and the wizard will automatically use those items whenever it is executed. Optionally the user may also manually execute a wizard to perform a web login or form fill by placing the cursor over the first input field and then tapping on the desired PSPAP wizard. The PSPAP wizard then proceeds to complete the web login or form fill moving from field to field and filling them in with the referenced credential items. Alternatively, a user may access one or more PSPAP browser extensions/plug-ins such as described below and depicted in FIG. 23 allowing the user to select a recognized input field, trigger a popup of a QR code, and then subsequently scan the QR code with their PED and the PSPAP will automatically find the correct PSPAP wizard for that page and execute it.

Figure 23:
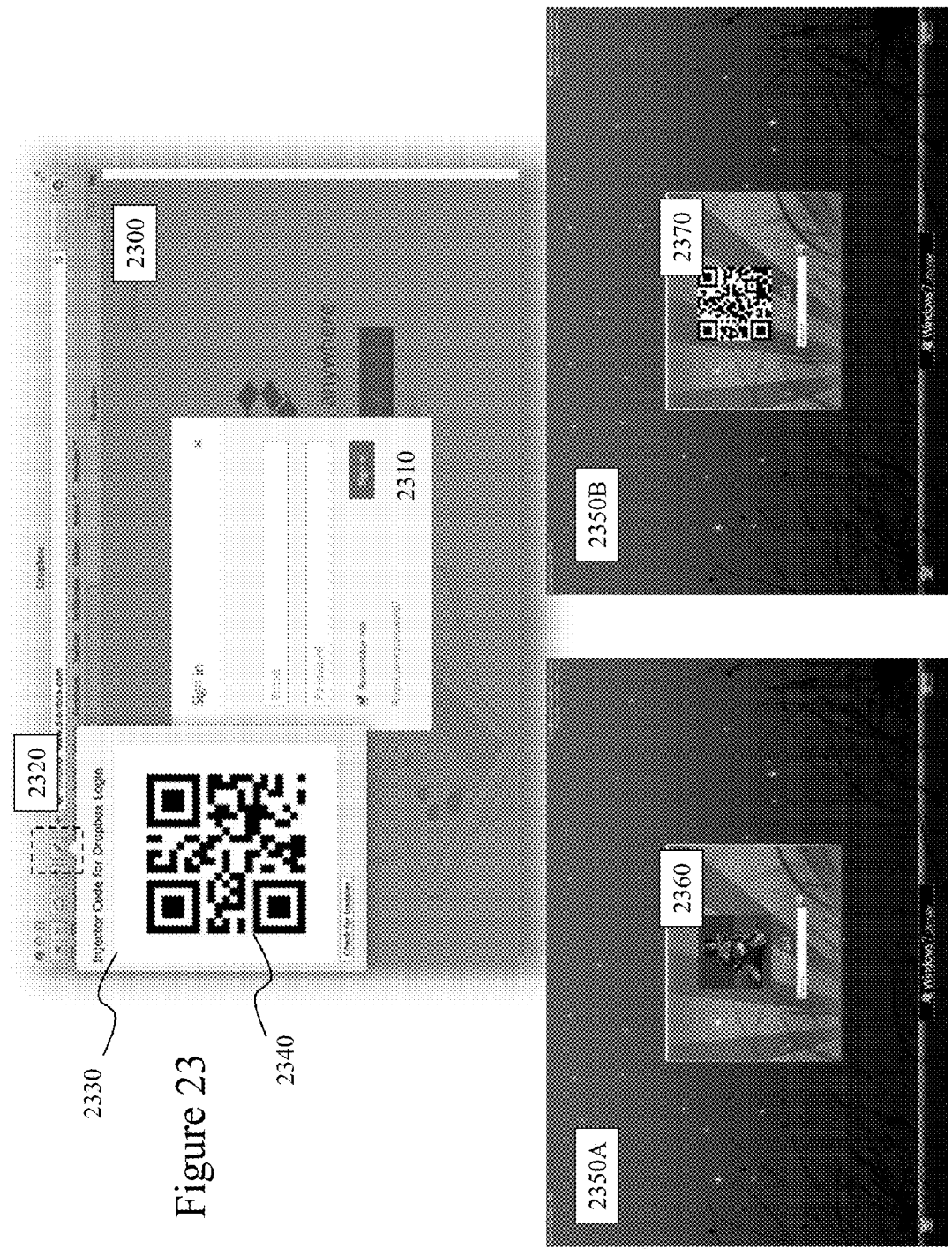
FIG. 23 depicts exemplary screenshots of 2D barcodes providing login request information according to embodiments of the invention.

Referring to FIG. 23 there is depicted an exemplary screenshot of a web browser plugin according to an embodiment of the invention wherein within a web application launched within the web browser, e.g. application 2300, which prompts for user credential entry through a dialog box 2310 there is also presented a PSPAP icon 2320. PSPAP icon 2320 when selected by the user results in pop-up 2330 with QR code 2340. Accordingly, the user can image the QR code 2340 on their PED, e.g. smartphone, thereby extracting the login credentials required that are then transmitted from the PED to the USB device, e.g. USB device 1700, attached to the computer system, e.g. first computer system 11, wherein they are then provided to the computer system through mimicry of a keyboard, and in some instances a mouse, allowing the required credentials to be entered. In a similar manner the user identity icon 2360 within a prior art login screen 2350, e.g. Windows 7, may be replaced with a QR code representation 2370 containing the user identity which may be similarly imaged, processed, and employed to trigger transfer of the login credential from the user's PED via the USB device to the computer system in a manner according to an embodiment of the invention presented supra.

Figure 24:
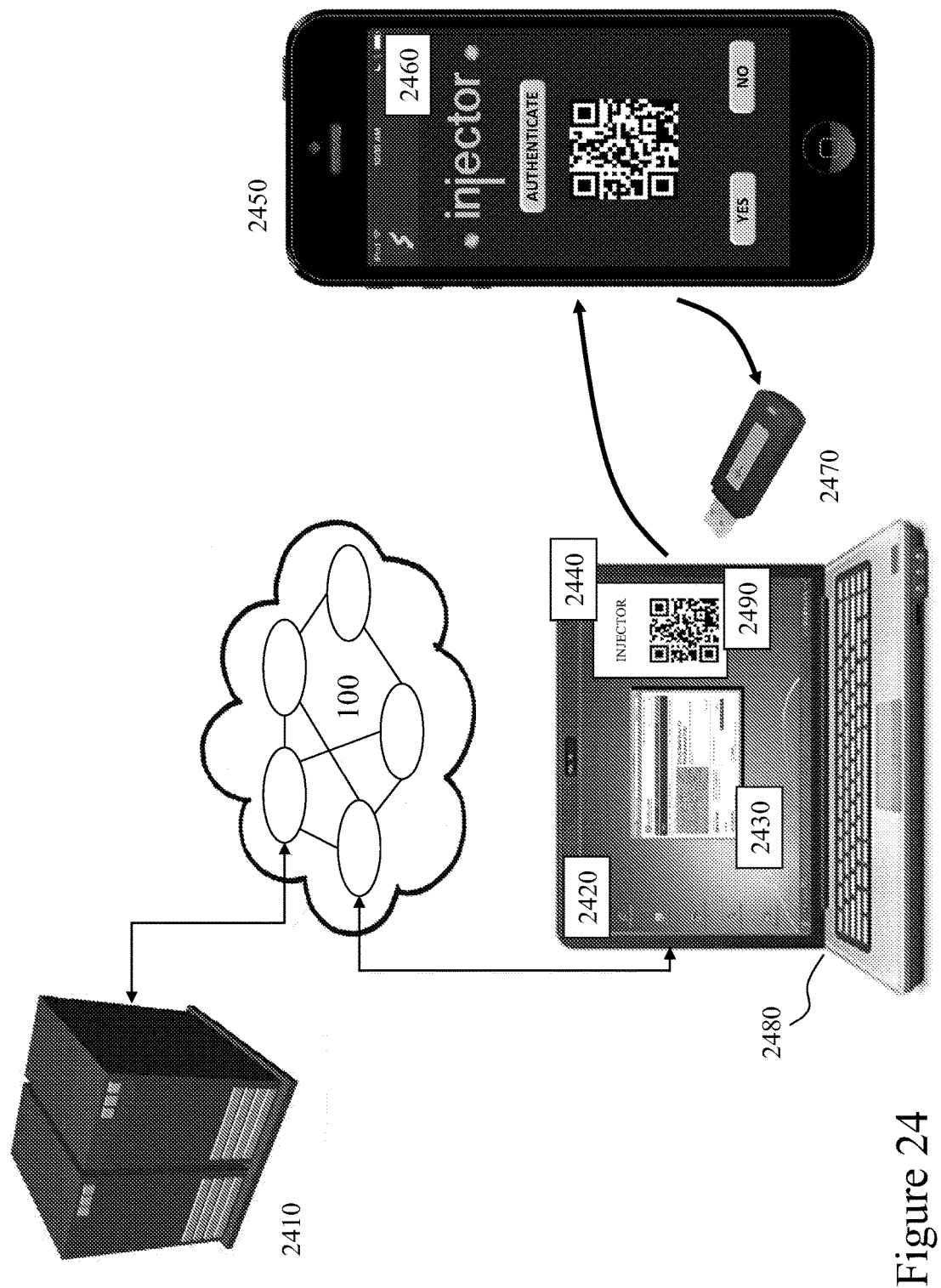
FIG. 24 depicts a simplified diagram showing an authentication method according to an embodiment of the invention for responding to a challenge issued by a remote authentication server.

Now referring to FIG. 24 there is depicted a simplified diagram showing an authentication method according to an embodiment of the invention for responding to a challenge issued by a remote authentication server. Accordingly, a user as part of an activity 2430, e.g. a financial transaction, online purchase, etc., within a web browser or user interface 2420 is provided with a challenge from a server 2410 which is received at the user's computer system 2480, e.g. their FED or PED. A PSPAP plug-in 2440 upon the user's computer system 2480 captures the authentication request and converts this to a QR code 2490. The user then can capture the QR code 2490 upon a PSPAP application in execution upon their PED 2450 wherein the user is then presented with authentication screen 2460 giving them button options to authenticate or not. If the decision is to authenticate then the PSPAP transmits to a USB device 2470 attached to the user's computer system 2480 the authentication code which is then provided back via user's computer system 2480 to the server 2410 authenticating the activity. In some instances the challenge may request additional information in addition to the basic authentication code(s) wherein this requirement would also be captured and embedded within the QR Code

2490, retrieved by the PSPAP or entered by the user and transmitted with the base authentication information to the USB device 2470.

Optionally, the PSPAP plug-may, to prevent spoofing, add additional content to the QR code 2490 wherein the additional content is known only by the PSPAP plug-in and the PSPAP upon the user's device. Accordingly, the PSPAP upon the user's device can verify that the QR code 2490 comprises visual code data generated in dependence upon the request from a trusted entity and is not being replayed or spoofed. The additional content may include, but not limited to, a digital signature, a one-time password, and a digital representation of a signature.

Accordingly, it would be evident that an embodiment of the invention such as described and depicted in respect of FIG. 24 exploiting QR codes may be employed as part of registration and/or authentication challenges such as those arising within evolving/emerging standards and proposed standards for reducing the reliance on passwords to authenticate users including for example, but not limited to, the FIDO Alliance's Universal Authentication Framework (UAF) protocol and Universal Second Factor (U2F) protocol.

Accordingly, considering a registration process compliant to the FIDO Alliance U2F specifications, which are drafted for exploiting a FIDO device then we have the following sequence (A):
(A) 1 Relying party creates challenge information for the FIDO device to respond to;
(A) 2 FIDO device digitally signs the challenge and sends it back along with other registration data; and
(A) 3 Relying party validates signature and authenticity of the device and registers a key for the user (from registration data).

Now this registration process using a PSPAP and USB device this process becomes the following sequence (B):
(B) 1 Relying party creates challenge information for the FIDO device to respond to;
(B) 2 PSPAP plug-in captures challenge and generates/displays QR code;
(B) 3 User captures image of QR code and PSPAP decodes to determine that challenge issued;
(B) 4 PSPAP sends required data, e.g. signed challenge, to USB device to generate response to challenge and also sends any other required registration data;
(B) 5 USB device sends signed challenge to relying party together with other required registration data; and
(B) 6 FIDO device digitally signs the challenge and sends it back along with other registration data; and
(B) 7 Relying party validates signature and authenticity of the device and registers a key for the user (from registration data).

It would be evident that in a similar manner that the authentication of a user using a process compliant to FIDO Alliance U2F process would be implemented as the following sequence (C).
(C) 1 Relying party creates challenge information for the FIDO device to respond to;
(C) 2 PSPAP plug-in captures challenge and generates/displays QR code;
(B) 3 User captures image of QR code and PSPAP decodes to determine that challenge issued;
(B) 4 PSPAP sends required data, e.g. signed challenge, to USB device to generate response to challenge and also sends any other required registration data;
(B) 5 USB device sends signed challenge to relying party together with other required registration data; and
(B) 6 FIDO device digitally signs the challenge and sends it back along with other registration data; and
(B) 7 Relying party validates signature.

Within embodiments of the invention presented supra reference is made in respect of some figures and descriptions to the use of QR codes to allow a user's PED to capture web login or form fill information. However, as evident from other sections of the specification a QR code is one code format of a range of possible code formats. Hence it would be evident to one skilled I the art that in these embodiments, e.g. FIGS. 22 to 24, that the QR code may be replaced within another barcode/code format.

Figure 25:
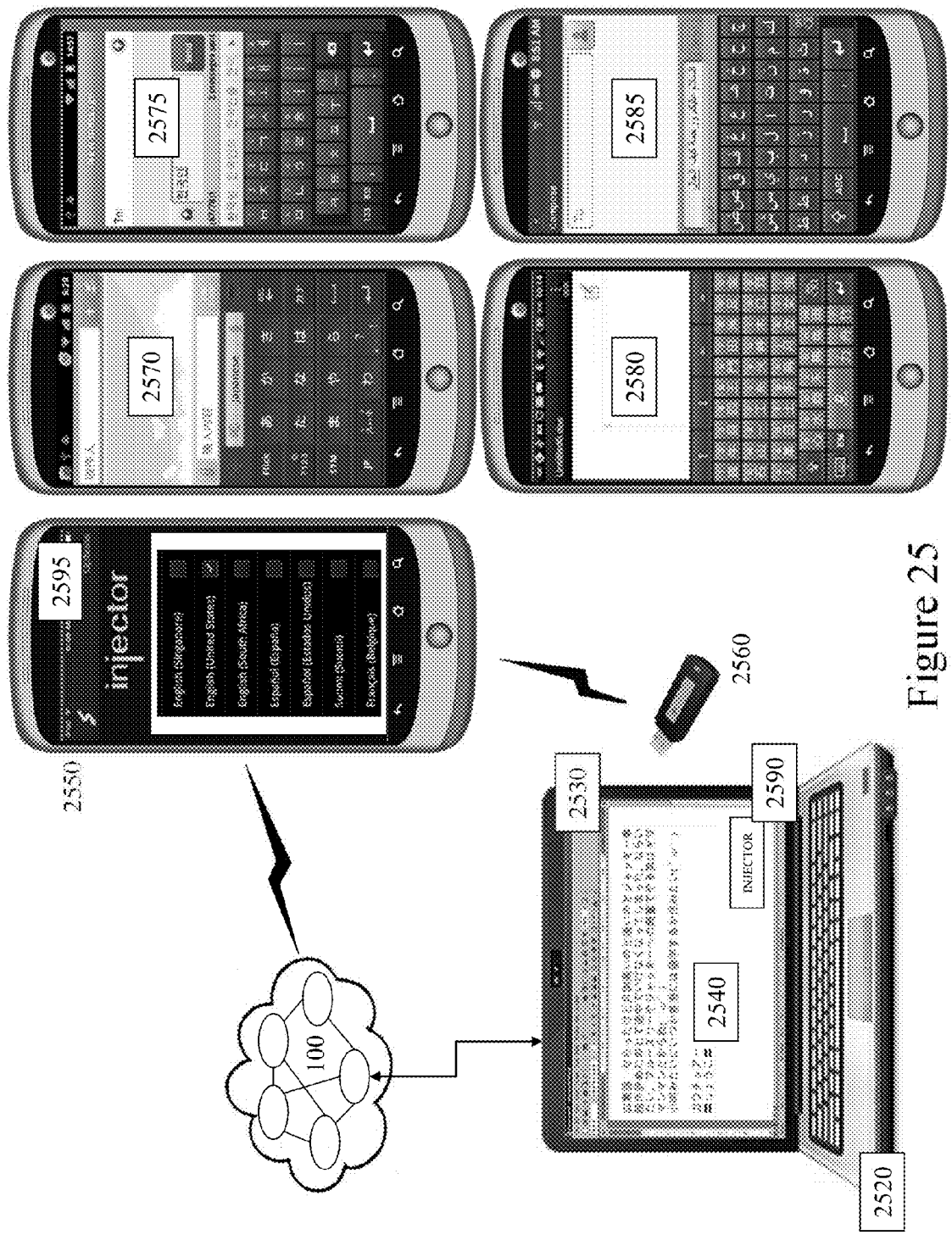
FIG. 25 depicts an embodiment of the invention relating to exploiting a portable device to provide a "universal" keyboard/character input interface for another electronic device.

Now referring to FIG. 25 there is depicted an embodiment of the invention relating to exploiting a PED providing a "universal" keyboard/character input format for another electronic device, e.g. FED or PED, wherein the PED provides an easier interface for entering foreign characters that the typical FED, laptop PED, etc. or allowing users to enter text/data into kiosks, etc. The basis for this arises on the grounds that a large number of PEDs, such as smartphones, are established at manufacture as "global devices" wherein they have software keyboards installed for a large number of languages, if not every language, and it is easy to select which foreign language the user wants to employ at any time, often with a simple gesture or small number of keystrokes/options whereas FEDs etc. require installation of a physical keyboard or the use of cryptic "ALT+KEY" code combinations to get the character of the language that the user requires.

As depicted in FIG. 25 a user is accessing a web browser or user interface 2530 upon a laptop 2520 upon which a software application "Injector" 2590 is installed in conjunction with a USB device 2560. During their activities upon the laptop 2520 the user wishes to enter text in a language other than that either default of the laptop 2520 or installed within the web browser or user interface 2530 that does not require a different keyboard. Selection of a language within the web browser or user interface 2530 not supported through the software within the web browser or user interface 2530 triggers a call to PED 2550 which launches a PED application 2595 upon the PED, "Injector", allowing the user to enter text within the selected language through an appropriate software keyboard such as first to fourth software keyboards 2570 to 2585 respectively representing in this instance Japanese, Korean, Chinese, and Arabic respectively. The software keyboard selections of the user are transferred from the PED 2550 to the USB device 2560 wherein they are converted to data representing the equivalent characters from a physical keyboard of the selected language or "ALT+KEY" code combination. Alternatively, the user within the software within the web browser or user interface 2530 triggers a call to PED 2550 based upon selection of a menu function rather than selecting a language not currently supported within the web browser or user interface 2530 as many software applications will not display options that have not been installed. In this instance the user may select the required language upon the PED through language selector option within the PED which is communicated to the USB device 2560 in addition to triggering the loading of the appropriate software keyboard.

Optionally, the web browser or user interface 2530 may be in execution upon the PED 2550 and calls internally upon the PED 2550 the software keyboard through the PED application 2595. In either instance the PED 2550 may be provided with software keyboard updates via network 100 or may request via network 100 from a remote server, not shown for clarity, a software keyboard not installed upon the PED 2550 or the request may relate to a dialect dictionary, dictionary, spell checker or other language support option relating to the language selected.

Within embodiments of the invention presented supra in respect of FIGS. 4 to 25 devices being interfaced to a PED/FED and receiving data/communications from a user's PED which are then provided to the PED/FED via the devices which emulate another device such as a keyboard or haptic interface such as mouse, for example. Optionally, in such scenarios in respect of FIGS. 4 to 25 and FIG. 26 to which the current discussion relates that the device, i.e. USB device 2640, may be locked such that it is only upon receipt of appropriate authorisation/credentials, for example, that the USB device 2640 will provide data to the PED/FED, e.g. laptop 2610, to which it is connected. This appropriate authorisation or provisioning of appropriate credentials being provided by a PED 2630 to which the USB device 2640 communicates via a local area wireless network, such as Bluetooth, Zigbee, etc. Accordingly, the USB device may take power from the PED/FED but otherwise is inaccessible to the PED/FED unless the appropriate authorisation/credentials have been acquired. Optionally, the USB device 2640 may comprise a battery such that the USB device 2640 does not draw power from the PED/FED until the appropriate authorisation/credentials have been acquired. Optionally, the USB device 2640 may wirelessly communicate to the PED/FED, e.g. laptop 2610, even though it draws power from the PED/FED, e.g. laptop 2610.

Within the prior art unlocking a removable storage device, i.e. a USB flash drive requires a password to unlock, it is necessary to run software on the host computer in order to unlock the drive as a password dialog is required. Accordingly, USB storage vendors today try to work around this by having multiple drives partitioned, of one is "read-only" and contains the software required to launch the password dialog and unlock the other drive partitioned onto the USB device so that this is locked and inaccessible until unlocked. However, in doing so these vendors must also communicate with the USB devices to send "unlock" commands in a manner that does not violate operating system restrictions. This can be difficult enough but the situation becomes even worse where the PED/FED is being booted using a portable operating system (OS) stored on the USB device. This arises as it is now necessary to initially boot the machine into a "pre-boot" environment in order to allow entry of the password after which the PED/FED can be "re-booted" with the portable OS. In contrast, embodiments of the invention circumvent this as the PED 2630 can unlock the USB device 2640 without requiring any pre-boot of the PED/FED onto which the portable OS is being installed. Within environments where increased security is required, e.g. no wireless communications, then a USB to audio conversion assembly 400, such as described previously in respect of FIG. 4 and other Figures with respect to embodiments of the invention, may be employed such that the communications from PED 2630 are through wired interface to the USB to audio conversion assembly 400 which is being unlocked.

Figure 26:
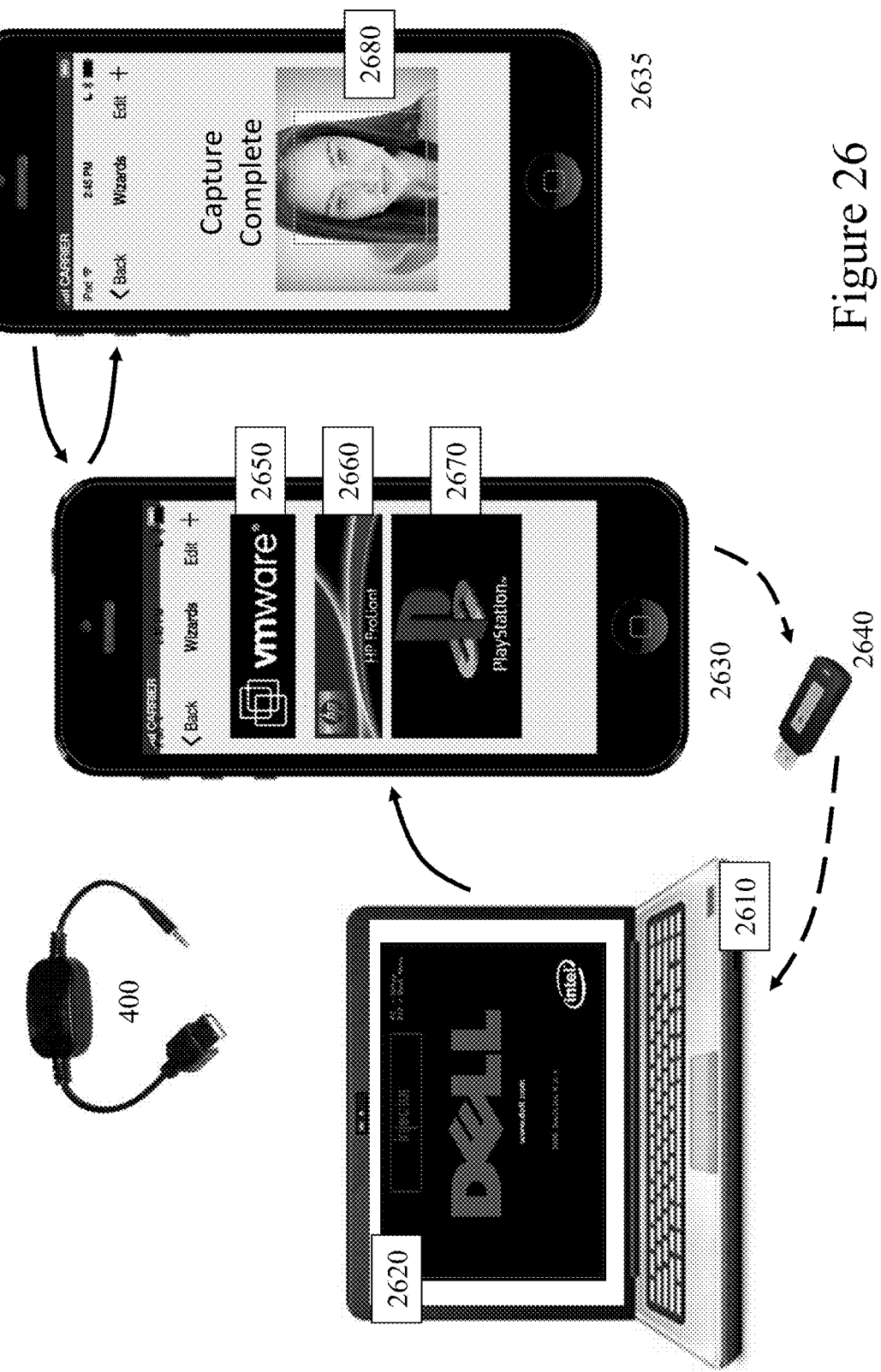
FIG. 26 depicts unlocking an interface adapter according to an embodiment of the invention upon receipt of appropriate authorisation/credentials and its subsequent use allowing a user to boot another electronic device with one operating system of multiple operating systems.

As depicted in FIG. 26 the PED 2630 is depicted as allowing the unlocking of multiple OS, depicted as first to third OS 2650 to 2670 respectively. Optionally, these may be separate partitioned drives within the USB to audio conversion assembly 400 or USB device 2640. In addition to supporting remote unlocking embodiments of the invention provide for additional biometric and/or credential provisioning in order to unlock a memory, drive, etc. above and beyond a password such as depicted within FIG. 26 wherein selection of an OS, one of first to third OS 2650 to 2670 respectively, a facial recognition application 2680 is launched as depicted upon PED image 2635 requiring facial recognition of a recognized authorized user in order to unlock the selected OS. In some embodiments of the invention the facial recognition application 2680 may be an already installed feature of the PED 2630 or it may form part of the software according to embodiments of the invention or separately loaded and accessed. It would be evident to one skilled in the art that other biometric data may be employed including, but not limited to, vocal characteristics, fingerprint, retinal image, etc. either discretely or in combination. Optionally, the one of the first to third OS 2650 to 2670 respectively is established in dependence upon the identity of the user authorised upon the PED. For example, a first user, e.g. an adult, triggers booting of the PED/FED into a computer operating system, e.g. Microsoft™ Windows, whilst a second user, e.g. a child, triggers booting of the PED/FED into a gaming operating system, e.g. Nintendo™ Playstation. Optionally, a memory device may be partitioned such that the partition or drives within the memory device accessible to the PED/FED vary according to the identity of the authorized user.

However, in some instances the credential management through aspects such as passwords, facial recognition, etc. may not be sufficient as access is required to be limited physically, i.e. geographically, in addition to individually. Accordingly, an enterprise may wish to have corporate managed credentials on an employee's PED such that they can be restricted for use only from certain locations only. For example, an enterprise may wish to enforce a Virtual Private Network (VPN) login policy such that a valid login can only be made from the enterprise's office or from the authorized individual's home location. With the ability to exploit geolocation features within the PED then the policy enforcement is performed within the same PED and the other processes. Accordingly, the PED geolocation provides for policy enforcement which is than exploiting prior art schemes such as IP whitelisting schemes.

Figure 27:
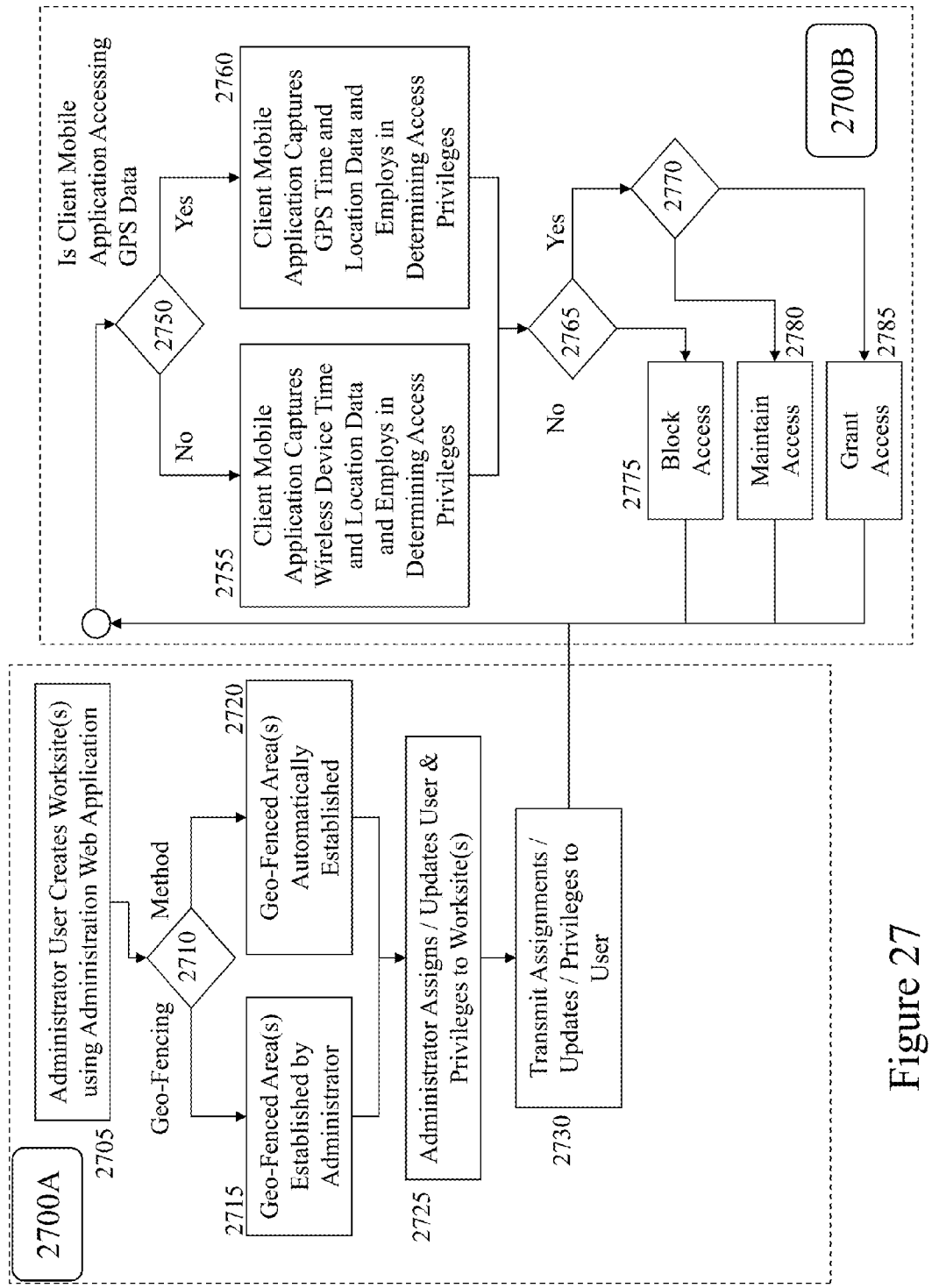
FIG. 27 depicts an exemplary process flow for administrative configuration of staff, worksites, activities, privileges etc. relating to geofencing user access to applications according to an embodiment of the invention

Referring to FIG. 27 there is depicted an exemplary process flow for administrative configuration of staff, worksites, activities, privileges etc. according to an embodiment of the invention. As depicted first sub-flow 2700A begins at step 2705 wherein an administrator establishes worksites within an administration web application, e.g. InjectorAdmin, before in step 2710 they select a method of establishing a geo-fence or geo-fences for the worksite(s). A single worksite, e.g. the employee's office may have multiple geo-fences rather than a single geo-fence covering the entire physical location. If the method selected was administrator set-up the process proceeds to step 2715 wherein the user may, for example, be presented with map of the worksite and surrounding area and through movement of a cursor, selection of a predetermined shape and adjustment, etc. defines the geo-fence. Alternatively, the user elects to have the geo-fence automatically established in step 2720 wherein, according to presets within a Password Injector Software-as-a-Service (PasInSAAS), a predetermined routine is employed by the PasInSAAS to establish the geo-fence. Such automated methods may include, but not be limited to, applying a predetermined geometrical fence to the worksite or extracting information from a third party API, e.g. Google Maps, based upon entering a physical address, e.g. the office address or residential address. From either step 2715 or step 2720 the process proceeds to step 2725 the administrator assigns or updates users and activities to the worksite(s) wherein in step 2730 these assignments or revisions to the assignments are transmitted to a Password Mobile Client Application (PswdMCA) application in execution upon that individual's PED. Optionally, the individual may be provided with a one-time location verification option such that when they receive a geo-fence they are presented with a map of this relative to the name of the geo-fenced location. In this manner an error in the mapped geo-fence to the location as the user understands it can be identified before the error blocks their use of embodiments of the invention.

Any subsequent adjustments to the assignments/privileges of the user(s) are then transmitted from the PasInSAAS to the PswdMCAs on their PEDs. First sub-flow 2700A then proceeds to step 2750 within second sub-flow 2700B wherein a determination is made as to whether a user's PED can access Global Positioning System (GPS) data relating to its location or whether an alternate geo-location methodology, such as wireless device accessed, transmitter triangulation, etc. is required in order to establish a location. If GPS data can be acquired then the process flow proceeds to step 2760 wherein the PswdMCA captures time and location information and then determines in step 2765 whether to grant or block access to the PswdMCA features based upon the determined geo-location. For a blocked determination the process proceeds via step 2775 to loop back to step 2750. For a granted determination the process proceeds from step 2765 to step 2770 wherein a determination as to whether access should be maintained or initially granted is determined wherein the process proceeds via steps 2780 and 2785 respectively before looping back to step 2750. It would be evident that time may be part of the determination in step 2765 as well as geo-location such that, for example, access to the user's office outside of say, 8 am to 6 pm weekdays, will not trigger authorization. Optionally, a time delay may be added to the loop described with respect to second sub-flow 2700B such that verifications of location and/or time are performed every minute, 90 seconds, or as established by the administrator with respect to that worksite.

Optionally, step 2775 upon a blocked access may log invalid attempts so that permanent lockout may be triggered, for example, after a predetermined number of attempts or where the geo-location data meets a set of blocked locations established by the administrator, for example. Similar data logging may also be performed in steps 2780 and 2785 respectively. Optionally, the geo-fence may be established with respect to a specific PED/FED such that the PED of the user must identify a wireless identity/beacon associated with the specific PED/FED in order for the authorization to be provided. Where the wireless identity/beacon associated is associated with a low power wireless standard, e.g. Bluetooth Class 2 (maximum output 2.5 mW and range approximately 30 feet (10 meters) unobstructed) or Bluetooth Class 3 (maximum output 1 mW and range approximately 3 feet (1 meter) unobstructed), then it would be evident that small geo-fences may be established as may large geo-fences such as within range of a specific wireless tower, e.g. GSM tower, or geographic zones ranging from parts of a building, to the building, city block, suburb, town, province, state, country etc.

Figure 28:
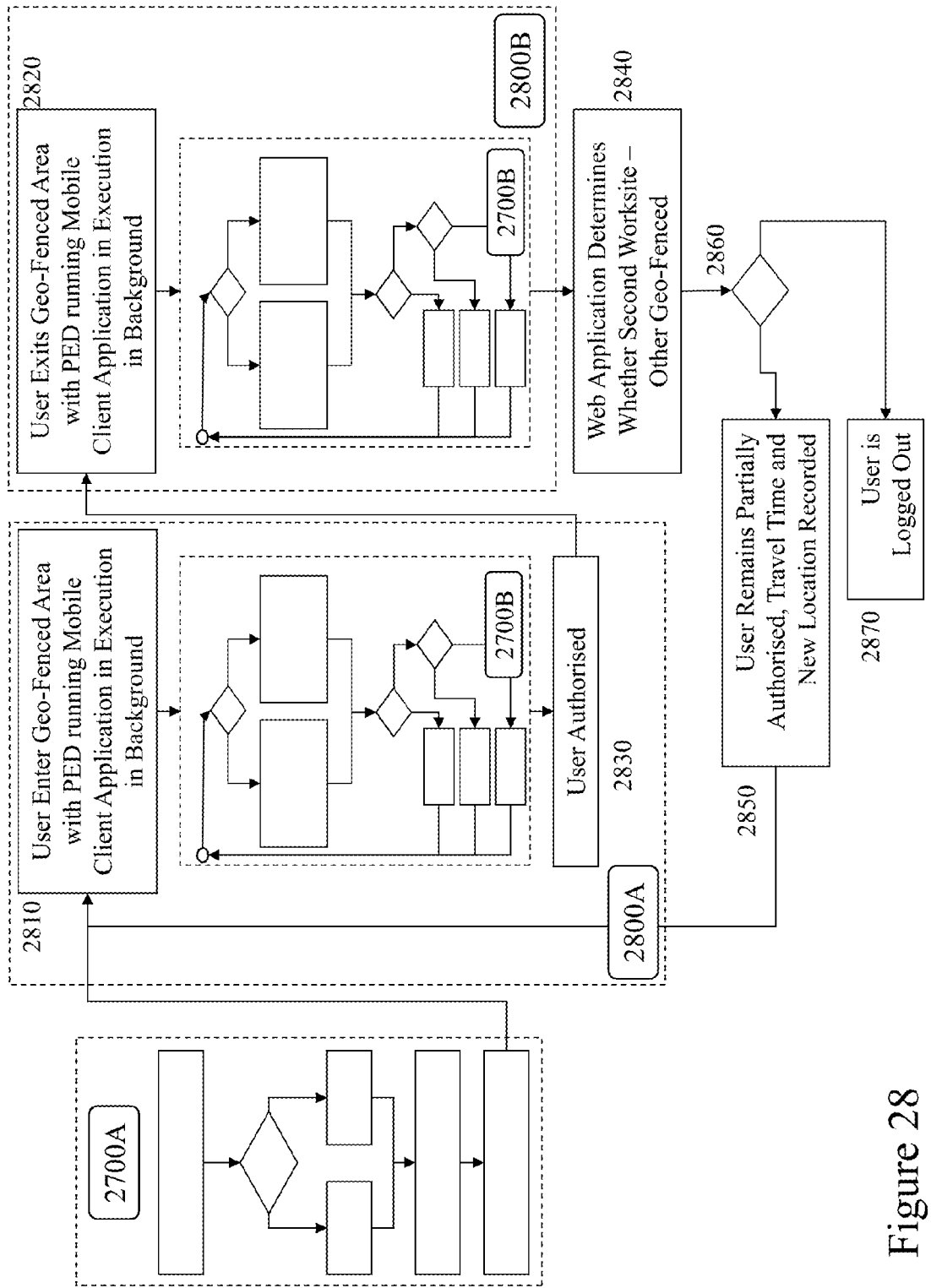
FIG. 28 depicts an exemplary process flow for time tracking for staff, worksites, and activities relating geofenced user access of applications according to an embodiment of the invention.

Now referring to FIG. 28 there is depicted an exemplary process flow for time tracking for staff, worksites, and activities. As depicted the process flow begins with first sub-flow 2700 before proceeding to first geo-fence flow 2800A with step 2810 wherein the first geo-fence flow 2800A in execution on the PED through PswdMCA determines whether the user has entered a geo-fenced area or not. If they are the process proceeds via second sub-flow 2700B to step 2830 wherein the user is "authorised." In second geo-fence flow 2800B in execution on the PED through the PswdMCA a determination is made as to whether the user has exited the geo-fenced area or not. If they have exited the geo-fenced area then the process proceeds via second sub-flow 2700B to step 2840. In step 2840 the PasInSAAS system determines whether the user is scheduled to a second worksite or another geo-fenced area to which the authorization relates. If not scheduled, then the user is "unauthorised" via step 2860 and 2870 otherwise the process proceeds to step 2850 via step 2860 wherein the user is "partially authorised" and their travel time/new locations are recorded and the process loops back to first geo-fence flow 2800A wherein the user is "authorised" to either the original worksite when they return or "authorised" to the second worksite. "Partial authorization" may relate to, for example, the fact that their initial biometric verification is a retina scan which cannot be performed with their PED but is performed with a kiosk installed at the worksite(s). In this manner a user may establish initial authorization at a first worksite (e.g. their office) and maintain "partial authorization" as they move to a second website (e.g. their laboratory) wherein they are re-authorised fully in the second worksite.

Optionally, the process flow within FIG. 28 may be considered as providing multiple access levels in conjunction with nested geo-fences. Accordingly, a user maybe authorized within a first geo-fence to access, via a USB device that provides password injection, PEDs/FEDs within the first geo-fence but is only authorized to a second password set and/or able to boot a system within a second geo-fence within the first geo-fence. Accordingly, nested hierarchies of rights/privileges can be provided according to embodiments of the invention. For example, a user may have email access authorization of any PED/FED within an enterprise's office but may only access engineering CAD software within a predetermined area within the enterprise's office. It would be evident that other nested geo-fence/privilege configurations may be established without departing from the scope of the invention. Optionally, the geo-fence may be associated with user credentials such as passwords, etc. or it may alternatively relate to authorizing access to a memory partition/logical disk drive etc. of the electronic device the user is accessing and/or a memory device such as described in respect of embodiments of the invention within this specification such as providing a boot operating system, memory relating to applications/data required by the user, etc.

Within embodiments of the invention presented supra discussion has been primarily focused to the acquisition of login and form fill information which can be subsequently provisioned to a computer system to automate login and form fill operations. Additionally, reference is made to replacing passwords with PSPAP generated passwords to enhance security to obsolete those previously used by the user. However, it would also be evident that the PSPAP may support Time-based One-Time-Password schemes (TOTP) wherein a different password is generated for every login. Because the password changes on every login it cannot be comprised through theft of password hacking but the new passwords must be identifiable by the receiving service, website, application, enterprise, etc. as being valid despite having not been provided to the service, website, application, enterprise, etc. Accordingly, TOTP schemes exploit a One-Time Password (OTP) or have the user's PED automatically generate these codes which are time-synchronized and have a shared secret "seed" with the service, website, application, enterprise, etc. to which access is sought, authentication provided etc., Accordingly, multiple services, websites, applications, enterprises, etc. will each have their own secret "seed" and time-synchronization process. Accordingly, the PSPAP can support these through the user following the registration process for TOTP and using a special credential item type for the TOTP seed. Once the "seed" is stored within the PSPAP it will then generate the One-Time-Password codes whenever required.

It would also be apparent that in other embodiments of the invention other plug-ins to the PSPAP may be implemented by third parties to provide additional security/verification information. Once such instance being as depicted in FIG. 2B wherein a financial institution provides users with a security device to generate a security code 25 for entry based upon their security code and other information such as partial account number to whom a transfer is being made. Accordingly, the financial institution may provide a plugin for the PSPAP allowing such security information to be generated within the PSPAP and transferred according to embodiments of the invention.

There are a number of situations where passwords may be required before a machine has even booted. Some examples are secure BIOS boot passwords and passwords to unlock many commercial full-disk-encryption products. These environments need to have a password before the operating system can even load, known commonly as pre-OS. Automating password fills when an operating system is not running does not present an issue to embodiments of the invention as there is no computer system side software requirement. Rather all the user has to do is plug in the USB device pre-OS and select the appropriate password within the PSPAP. It would also be evident that the PSPAP may automate, in what the inventors refer to as a local mode, the login and form fill processes within a web browser, service, application, web page etc. upon the same PED and/or FED upon which the PSPAP is in execution as now the PSPAP can provide directly without external communication the required passwords, field selection etc.

Within embodiments of the invention presented supra the primary configuration has been a user's PED in conjunction with a computer system. However, it would be evident that the computer system may be generalized to a FED or another PED, e.g. an ATM, laptop, etc. and that the interfaces may be wired and/or wireless between the device executing the PSPAP and the device having the login screen requiring user input.

Within embodiments of the invention the USB device mimics a keyboard and/or a mouse. It would be evident that the USB device may mimic other cursor controllers other than a mouse including but not limited to a tracker ball, touchpad, touch sensitive screen, and an electronic tablet. Further, within the embodiments of the invention the USB interface has been depicted as employing USB connectors according to Standard A. However, it would be evident that other embodiments of the invention may exploit USB connectors according to Standard B, Micro-B, and Mini-B. Alternatively, the USB device may exploit non-USB connectors including but not limited to RS-232, PS/2, serial port connectors, and parallel port connectors. Optionally, the USB device may connect directly to the computer system via a wireless interface and/or the USB device may be bypassed by the PED and/or FED executing the PSPAP communicating directly to the computer system. For example, a user's smartphone may exploit Bluetooth™ to mimic wirelessly connected keyboard and/or mouse.

Within the embodiments of the invention presented supra the primary configuration has been a user's PED having installed and in execution the PSPAP. However, it would be evident that in other embodiments of the invention the PSPAP may in execution upon a FED and be employed to provide password, credential, and identity information to applications, services, web pages and web browsers upon another FED or a PED. Accordingly, a gaming console may be employed to provide PSPAP functionality to an Internet enabled television. It would also be evident that a PED may also include a wearable device.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A portable memory device comprising:
   a non-volatile, non-transitory memory for storing data and computer executable instructions relating to at least an authorization procedure and a data transfer procedure;
   a microprocessor in communication with the non-volatile, non-transitory memory to execute the at least the authorization procedure and the data transfer procedure; wherein
      the authorization procedure comprises receiving authorization from a first electronic device connected to the portable memory device to provide access to data stored within the portable memory device relating to a boot operating system;
      the data transfer procedure comprises transferring the data relating to the boot operating system stored within the portable memory device to a second electronic device in order to boot the second electronic device that is also connected to the portable memory device; and
      a signal transmitted from the first electronic device to the portable memory device relates to authorizing access to a predetermined portion of the portable memory device allowing access to data stored within the predetermined portion of the portable memory device by the portable memory device;
      a first portion of the predetermined subset of data within the signal transmitted to the second electronic device by the portable memory device cause a second microprocessor forming part of the second electronic device to mimic user actions with a keyboard and a cursor controller to provide user credential entry into data entry fields upon the second electronic device to which the portable memory device is connected; and
      a second portion of the predetermined subset of data comprises at least one of a uniform resource locator relating to a webpage containing entry fields for user credential entry and locations within a webpage of entry fields for user credential entry; wherein
   the first electronic device and the second electronic device are different devices; and establishing whether to provide the authorization from the first electronic device to the portable memory device is established in dependence upon determining whether the first electronic device is within a predetermined geo-fence which is established in dependence upon user credentials employed to authorise a user upon the first electronic device.

2. The portable memory device according to claim 1, wherein
the first device is a portable electronic device; and
the first device is connected to the portable memory device by a predetermined wireless standard.

3. The portable memory device according to claim 1, wherein
receiving the authorization upon the portable memory device from the first device comprises receiving authorization data transmitted by the first device to the portable memory device in dependence upon a valid authorization of a user of the first device.

4. The portable memory device according to claim 1, wherein
the data stored within the portable memory device relating to the boot operating system is one portion of a plurality of portions of data stored within the portable memory device with each portion relating to a different operating system; and
receiving the authorization upon the portable memory device from the first device comprises receiving the authorization data transmitted by the first device to the portable memory device in dependence upon a valid authorization of a user of the first device; wherein
the authorization data is established in dependence upon the authorized user of the first device such that the boot operating system of the electronic device is established in dependence upon the authorizing user.

5. The portable memory device according to claim 1, wherein
the data stored within the portable memory device relating to the boot operating system is stored within at least one of a memory partition of a plurality of memory partitions of the memory device and a logical computer drive of a plurality of logical computer drives of the memory device with each memory partition relating to at least one of a different operating system and a different operating system configuration; and
receiving the authorization upon the portable memory device from the first device comprises receiving authorization data transmitted by the first device to the portable memory device in dependence upon a valid authorization of a user of the first device; wherein
the authorization data is established in dependence upon the authorized user of the first device such that at least one of which memory partitions of the plurality of memory partitions and which logical computer drives of the plurality of logical computer drives are accessible to the electronic device are established in dependence upon the authorizing user.

6. The portable memory device according to claim 1, wherein
the authorization procedure further comprises receiving second authorization data from a portable electronic device concurrently connected to the portable memory device with the first device.

7. The portable memory device according to claim 1, wherein
the memory device is coupled to the first device by at least one of a wired connection, a connector, a wireless connection, and an optical connection.

8. The portable memory device according to claim 1, wherein
each of the first device and the electronic device are at least one of a portable electronic device and a fixed electronic device; and
the portable memory device is coupled to the first device by at least one of a connector and a wireless interface according to a predetermined standard.

9. A portable memory device comprising:
a non-volatile, non-transitory memory for storing data and computer executable instructions relating to at least an authorization procedure and a data transfer procedure; and
a microprocessor in communication with the non-volatile, non-transitory memory to execute the computer executable instructions relating to the authorization procedure, the data transfer procedure, and access the stored data; wherein
the stored data comprises a plurality of data representing first user credentials relating to access upon an electronic device;
the authorization procedures comprises establishing an authorization upon a portable device with respect to a user associated with the first user credentials in dependence upon the portable device being within a predetermined geo-fence established in dependence upon second user credentials relating to the user's authorized access to the portable device; and
the data transfer procedure comprises transmitting in dependence upon the authorization a signal from the portable memory device to the electronic device comprising at least a second microprocessor via a communications interface of the electronic device according to a first predetermined standard, the signal comprising a predetermined subset of data within the plurality of data; wherein
the signal transmitted from the portable memory device to the electronic device relates to authorizing access to a predetermined portion of the electronic device thereby allowing access to data stored within the predetermined portion of the electronic device;
a first portion of the predetermined subset of data within the signal transmitted to the electronic device by the portable device cause the second microprocessor to mimic user actions with a keyboard and a cursor controller to provide user credential entry into data entry fields upon the electronic device to which the portable memory device is also connected; and
a second portion the predetermined subset of data within the plurality of data comprises at least one of a uniform resource locator relating to a webpage containing entry fields for user credential entry and locations within a webpage of entry fields for user credential entry.

10. The portable memory device according to claim 9, wherein
the second device is a portable memory device;
the signal transmitted from the first device to the second device relates to authorizing access to a predetermined portion of the memory device allowing access to data stored within the predetermined portion of the memory device by the second device; and
the predetermined portion of the memory device is a memory partition or a logical disk drive.

11. The portable memory device according to claim 9, wherein the predetermined geo-fence is established by at least one of a process based upon defining the geo-fence through a graphical user interface and automatically based upon information provided by the user and a third party application.

12. The portable memory device according to claim 9, wherein
- the predetermined geo-fence is defined by first data relating to a geographic location and second data relating to future points in time, wherein
  - the first data comprises at least one of a series of latitude-longitude coordinates, a wireless transmitter identity of a plurality of wireless transmitters, and a location determined by triangulation with a plurality of wireless transmitters; and
  - the second data comprises at least one of a date, a schedule relating to at least one of dates and days of the week, and a schedule relating to at least one of times of the day and work shifts.

13. A portable memory device comprising:
- a non-volatile, non-transitory memory for storing data and computer executable instructions relating to at least an authorization procedure and a data transfer procedure; and
- a microprocessor in communication with the non-volatile, non-transitory memory to execute the computer executable instructions relating to the authorization procedure and the data transfer procedure and access the stored data; wherein
  - the authorization procedure comprises receiving authorization from a first electronic device connected to the portable memory device to provide access to data stored within the portable memory device relating to a boot operating system in dependence upon the first electronic device being within a predetermined geo-fence established in dependence upon the user credentials within the received authorization;
  - the data transfer procedure comprises transferring the data relating to the boot operating system stored within the portable memory device to a second electronic device in order to boot the second electronic device that is also connected to the portable memory device;
  - a signal transmitted from the first electronic device to the portable memory device relates to authorizing access to a predetermined portion of the portable memory device allowing access to data stored within the predetermined portion of the portable memory device by the portable memory device;
  - the predetermined geo-fence was established by at least one of a process based upon defining the geo-fence through a graphical user interface and automatically based upon information provided by the user and a third party application; and
  - a first portion of the predetermined subset of data transmitted to the second electronic device by the portable memory device cause a second microprocessor forming part of the second electronic device to mimic user actions with a keyboard and a cursor controller to provide user credential entry into data entry fields upon the second electronic device to which the portable memory device is also connected; and
  - a second portion the predetermined subset of data transmitted to the second electronic device by the portable memory device comprises at least one of a uniform resource locator relating to a webpage containing entry fields for user credential entry and locations within a webpage of entry fields for user credential entry.

14. A portable memory device comprising:
- a non-volatile, non-transitory memory for storing data and computer executable instructions relating to at least an authorization procedure and a data transfer procedure; and
- a microprocessor in communication with the non-volatile, non-transitory memory to execute the computer executable instructions relating to the authorization procedure, the data transfer procedure, and access the stored data; wherein
  - the stored data comprises a plurality of data representing first user credentials relating to access upon an electronic device;
  - the authorization procedures comprises establishing an authorization upon a portable device with respect to a user associated with the first user credentials in dependence upon the portable device being within a predetermined geo-fence established in dependence upon second user credentials relating to the user's authorized access to the portable device; and
  - the data transfer procedure comprises transmitting in dependence upon the authorization a signal from the portable memory device to the electronic device comprising at least a second microprocessor via a communications interface of the electronic device according to a first predetermined standard, the signal comprising a predetermined subset of data within the plurality of data; wherein
  - the signal transmitted from the portable memory device to the electronic device relates to authorizing access to a predetermined portion of the electronic device thereby allowing access to data stored within the predetermined portion of the electronic device;
  - the predetermined portion of the electronic device is a memory partition or a logical disk drive;
  - the predetermined geo-fence was established by at least one of a process based upon defining the geo-fence through a graphical user interface and automatically based upon information provided by the user and a third party application;
  - a first portion of the predetermined subset of data transmitted to the second electronic device by the portable memory device cause a second microprocessor forming part of the second electronic device to mimic user actions with a keyboard and a cursor controller to provide user credential entry into data entry fields upon the second electronic device to which the portable memory device is also connected; and
  - a second portion the predetermined subset of data transmitted to the second electronic device by the portable memory device comprises at least one of a uniform resource locator relating to a webpage containing entry fields for user credential entry and locations within a webpage of entry fields for user credential entry.

* * * * *